United States Patent
Grbic et al.

(10) Patent No.: US 12,265,285 B1
(45) Date of Patent: Apr. 1, 2025

(54) EFFICIENT COMPUTATION OF SPATIALLY-DISCRETE TRAVELING-WAVE MODULATED STRUCTURES

(71) Applicant: THE REGENTS OF THE UNIVERSITY OF MICHIGAN, Ann Arbor, MI (US)

(72) Inventors: Anthony Grbic, Ann Arbor, MI (US); Cody Scarborough, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 313 days.

(21) Appl. No.: 17/898,622

(22) Filed: Aug. 30, 2022

Related U.S. Application Data

(60) Provisional application No. 63/238,379, filed on Aug. 30, 2021.

(51) Int. Cl.
*G02F 1/01* (2006.01)

(52) U.S. Cl.
CPC ..................... *G02F 1/01* (2013.01)

(58) Field of Classification Search
CPC ........................................................ G02F 1/01
USPC ........................................................ 356/503
See application file for complete search history.

(56) References Cited

U.S. PATENT DOCUMENTS

| | | | | |
|---|---|---|---|---|
| 5,995,270 A | * | 11/1999 | Kawano | G02F 1/01708 359/254 |
| 11,333,798 B2 | * | 5/2022 | Raeker | G02F 1/01 |

* cited by examiner

*Primary Examiner* — Seung C Sohn
(74) *Attorney, Agent, or Firm* — Harness, Dickey & Pierce, P.L.C.

(57) ABSTRACT

Traveling-wave modulation is a form of space-time modulation which has been shown to enable unique electromagnetic phenomena such as non-reciprocity, beam-steering, frequency conversion, and amplification. The capability to accurately simulate spatially-discrete traveling-wave modulated structures is critical to design. However, simulating these structures is challenging due to the complex space-time dependence of the constituent unit cells. Thus, an interpath relation is derived for spatially-discrete traveling-wave modulated structures. The interpath relation reveals that the field within a single time-modulated unit cell (rather than an entire spatial period) is sufficient to determine the field solution throughout space. It is shown that the interpath relation can be incorporated into existing periodic method of moments solvers simply by modifying the source basis functions. As a result, the computational domain is reduced from an entire spatial period to a single time-modulated unit cell, dramatically reducing the number of unknowns.

19 Claims, 8 Drawing Sheets

EFFICIENT COMPUTATION OF SPATIALLY-DISCRETE TRAVELING-WAVE MODULATED STRUCTURES

CROSS-REFERENCE TO RELATED APPLICATIONS

This application claims the benefit of U.S. Provisional Application No. 63/238,379, filed on Aug. 30, 2021. The entire disclosure of the above application is incorporated herein by reference.

GOVERNMENT CLAUSE

This invention was made with government support under FA9550-18-1-0379 awarded by the U.S. Air Force. The government has certain rights in the invention.

FIELD

The present disclosure relates to spatially-discrete traveling-wave modulated structures.

BACKGROUND

Space-time modulation has attracted renewed interest within the field of electrodynamics. Progress in the availability/performance of tunable components and materials has drawn researchers to examine time and space-time variation as a means to achieve frequency conversion, amplification and non-reciprocity. In the late 1950s, traveling-wave ferromagnetic amplifiers were explored. It was shown that amplification and frequency conversion can be simultaneously achieved by applying a traveling-wave modulation of permeability to a coupled transmission-line system. Leading into the 1960s, E. Cassedy and A. Oliner examined the dispersion relations that arose from a medium whose permittivity is modulated by a traveling-wave. Similar to coupled-mode theory applied to multiconductor transmission lines, the stop bands of the modulated structure were attributed to co-directional or contra-directional coupling. However, rather than coupling between conductors, the energy couples between frequency harmonics.

As the performance of tunable elements such as varactor diodes, electro/acousto/magneto-optic media, phase-change materials, and 2D materials has improved, researchers have begun implementing and expanding the theory of space-time modulated media. This has led to the study of space-time modulated metasurfaces. In these structures, tunable components are arranged or patterned onto a surface or a stack of surfaces. In particular, significant attention has been paid to the capabilities of traveling-wave modulated metasurfaces, such as the structure depicted in FIG. 1. In the continuous limit (i.e. the modulation is a continuous function of space and time), the behavior of traveling-wave modulated metasurfaces can often be predicted analytically via the Lorentz transform. However, in practice, traveling-wave modulation is frequently achieved via staggered modulation of an array of discrete unit cells. Such a configuration is referred to herein as spatially-discrete traveling-wave modulation (SDTWM). In this configuration, the individual time-modulated unit cells are referred to as space-time pixels or stixels. The discrepancy in the response between the continuous and discrete model has been generally overlooked in design. The biasing networks and fine features within the unit cells are typically only considered in a full-wave simulation just before fabrication or as a validation of the continuous model.

The design of traveling-wave modulated metasurfaces has disrupted the traditional workflow of RF engineers and scientists. Typically, the theoretical performance of a physical device or idealized structure can be optimized and validated using a full-wave solver or circuit simulator. A large body of work has gone into the development of numerical methods, and commercial solvers have become indispensable in design. However, SDTWM structures often require complicated biasing networks and extreme temporal variation. From a computational standpoint, this is problematic since most commercial solvers cannot handle problems which vary in both space and time. While modern numerical techniques (such as finite-difference time-domain method and harmonic balance) can be used to solve space-time-dependent problems, the computational cost to maintain sufficient numerical accuracy can be prohibitive.

In this disclosure, the space-time symmetry of SDTWM structures is used to shrink the computational domain of a SDTWM structure from a spatial period to a single stixel, dramatically reducing the computational cost. A stixel is a fraction of a spatial period: a space-time pixel. The boundary condition (referred to as the interpath relation) that exists between the stixels of a SDTWM structure is introduced, derived and used in a method of moments (MoM) formulation to substantially decrease the number of unknowns. This section provides background information related to the present disclosure which is not necessarily prior art.

SUMMARY

This section provides a general summary of the disclosure, and is not a comprehensive disclosure of its full scope or all of its features.

A computational method is presented for simulating a spatially-discrete traveling-wave modulated structure. The method includes: defining a spatially-discrete, traveling-wave modulated structure, where the spatially-discrete, traveling-wave modulated structure is divided into unit cells arranged periodically along one or more spatial dimensions, such that each unit cell exhibits a periodic time-variation of a parameter that is delayed with respect to the periodic time-variation of the parameter exhibited by adjacent cells and the parameter is an electromagnetic property of the unit cells; applying an incident wave of electromagnetic radiation onto the spatially-discrete traveling-wave modulated structure; defining a boundary condition at edges of a given unit cell of the spatially-discrete traveling-wave modulated structure to compute the electromagnetic field within the given unit cell, where the boundary condition relates the electromagnetic field at opposing edges of the given unit cell by the phase shift of the incident wave or a fundamental wavenumber, and a frequency-harmonic dependent phase shift induced by the spatially-discrete traveling-wave modulation structure; and computing, by a computer processor, a scattered electric field within the given cell using the boundary condition. The time delay between unit cells of the spatially-discrete traveling-wave modulated structure can in turn be designed using the computed scattered electric field within the given cell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
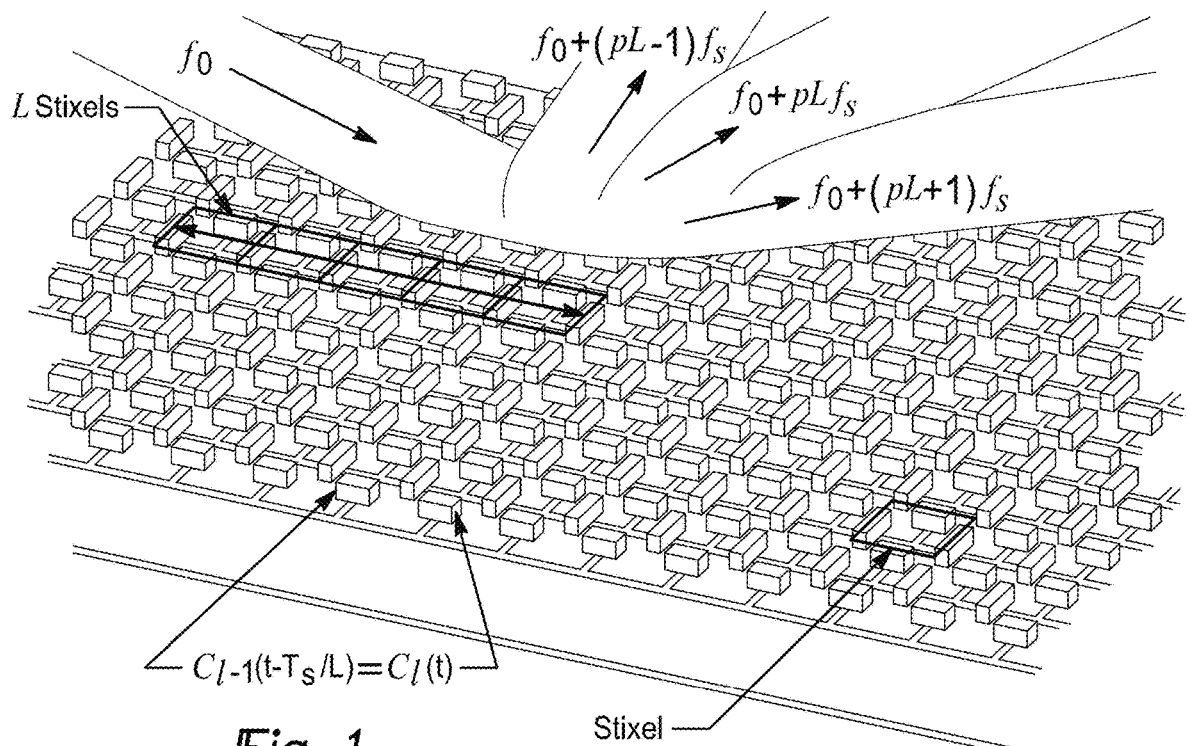
FIG. 1 illustrates a spatially-discrete traveling-wave modulated structure.

FIG. 1 illustrates a spatially-discrete traveling-wave modulated (SDTWM) structure. Each spatial period is made up of L "stixels" (indivisible unit cells). In this example, the structure consists of metallic patches interconnected by varactor diodes, placed above a grounded dielectric substrate. The varactor diodes are modulated in the form of spatially-discrete traveling-wave. That is, the varactor capacitance $C_l(t)$ within stixel l is delayed in time with respect to the previous stixel l−1. Note that when the spatial period is sufficiently small and the modulation frequency $f_s=1/T_s$ is low, frequencies separated by $pLf_s (p \in \mathbb{Z})$ all propagate in the same direction. Other implementations for the SDTWM structure are also contemplated by this disclosure.

The staggered modulation scheme used to achieve SDTWM structure is reminiscent of N-path circuit networks. An N-path network contains a set of linear, periodically time-varying (LPTV) systems (paths) connected to an input and output in parallel. The defining characteristic of an N-path network is that the time-variation of each path is delayed with respect to the previous path. This means that if a time-varying component (say a time-varying capacitor) on the first path has time dependence $C_0(t)$, then the time dependence on path l is $C_0(t-lT_s/L)$, where $T_s$ is the modulation period and L is the number of paths in parallel.

A relation was derived between the voltages and currents on each path of an N-path circuit network as described by C. Scarborough and A. Grbic in "Accelerated N-path network analysis using the Floquet scattering matrix method" IEEE Trans on Microwave Theory and Techniques 2020 which is incorporated in its entirety herein. When the network is excited by a time harmonic signal at frequency $\omega_0$, the time-domain relation between the voltage on each path, $v_l(t)$, is given by $$v_l(t)=e^{j\omega_0 t_0}v_{l-1}(t-t_0), \qquad (1)$$

where $t_0=T_s/L$. The same relation holds for the current on each path. Further, since the system is LPTV, the voltage can be expanded into harmonics of the form $$v_l(t) = \sum_{v=-\infty}^{\infty} V_l^v e^{j(\omega_0+v\omega_s)t} \qquad (2)$$

Substituting this expansion in (1) yields $$V_l^v=e^{-j2\pi v/L}V_{l-1}^v \qquad (3)$$

From this expression, it can be seen that the N-path modulation induces a phase shift of $-2\pi v/L$ between the paths for the $v^{th}$ harmonic.

Next, the interpath relation for N-path circuit networks reported by C. Scarborough and A. Grbic in "Accelerated N-path network analysis using the Floquet scattering matrix method" will be extended to SDTWM structures; this article is also incorporated in its entirety herein. The implications and applications of the interpath relation will then be examined.

Figure 2:
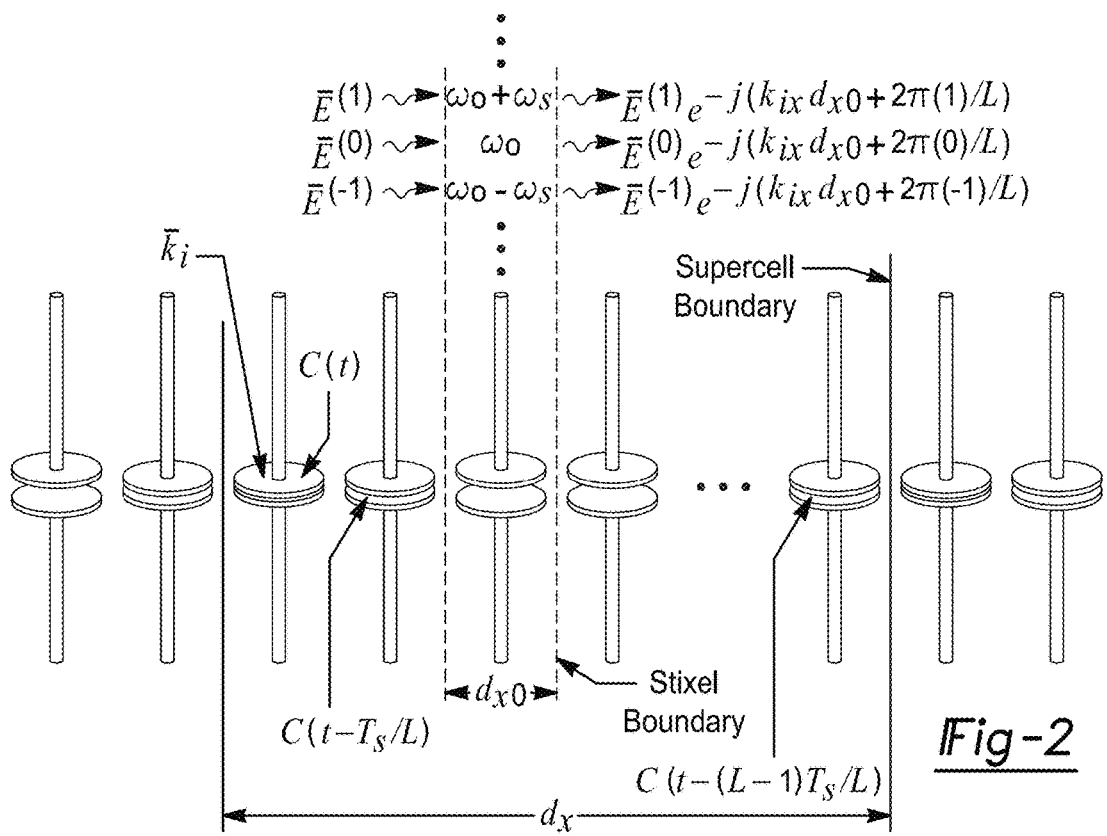
FIG. 2 illustrates an infinite array of capacitively loaded dipoles modulated in the form of a spatially-discrete traveling-wave.

For illustration purposes, the interpath relation is derived for the case of a plane wave incident upon a SDTWM structure. As an example, consider the array of capacitively loaded dipoles shown in FIG. 2. The capacitance loading each dipole is a periodic function in time with period $T_s$. Further, the structure is spatially periodic along x with period $d_x$. A single spatial period is referred to as a supercell. Supercells are made up of L sub-domains referred to as stixels, each having a width of $d_{x0}$. The temporal variation of the capacitor within stixel l is related to that within stixel l−1 via $$C_l(t)=C_{l-1}(t-t_0), \qquad (4)$$

where $t_0=T_s/L$. From this expression, one can observe that the variation of each capacitor is staggered in time, just as in the case of N-path circuit networks. Now consider two cases of plane wave illumination. In case A, the incident field is given by $$\vec{\varepsilon}_i^A(\vec{r},t)=\vec{E}_0 e^{j(\omega_0 t-\vec{k}_i\cdot\vec{r})}, \qquad (5)$$

where $\bar{k}_i = k_{ix}\hat{x} + k_{iy}\hat{y} + k_{iz}\hat{z}$. Meanwhile, in case B, the incident field is given by $$\bar{\varepsilon}_i^B(x, y, z, t) = \bar{\varepsilon}_i^A(x - d_{x0}, y, z, t - t_0) \quad (6)$$
$$= e^{-j(\omega_0 t_0 - k_{ix} d_{x0})} \bar{\varepsilon}_i^A(\bar{r}, t)$$

Define the total fields for cases A and B as $\bar{\varepsilon}^A(\bar{r}, t)$ and $\bar{\varepsilon}^B(\bar{r}, t)$ respectively. Since the system is linear, note that $$\bar{\varepsilon}^B(x,y,z,t) = e^{-j(\omega_0 t_0 - k_{ix} d_{x0})} \bar{\varepsilon}^A(x,y,z,t). \quad (7)$$

Further, by shifting the space-time coordinate system in case B from (x, y, z, t) to (x', y, z, t'), such that x'=x−$d_{x0}$ and t'=t−$t_0$, case A is reproduced. This implies $$\bar{\varepsilon}^B(x, y, z, t) = \bar{\varepsilon}^A(x', y, z, t') \quad (8)$$
$$= \bar{\varepsilon}^A(x - d_{x0}, y, z, t - t_0).$$

Equating the right-hand sides of (7) and (8), one obtains $$e^{-j(\omega_0 t_0 - k_{ix} d_{x0})} \bar{\varepsilon}^A(x,y,z,t) = \bar{\varepsilon}^A(x - d_{x0}, y, z, t - t_0). \quad (9)$$

Thus, when a SDTWM structure is excited by a plane wave, the total fields satisfy $$\bar{\varepsilon}(x,y,z,t) = e^{j(\omega_0 t_0 - k_{ix} d_{x0})} \bar{\varepsilon}(x - d_{x0}, y, z, t - t_0). \quad (10)$$

This expression represents the time-domain interpath relation for SDTWM structures. Since the system is LPTV, the fields throughout space can be expanded into frequency harmonics as $$\bar{\varepsilon}(\bar{r},t) = \sum_{v=-\infty}^{\infty} \bar{E}^v(\bar{r}) e^{j(\omega_0 + v\omega_s)t} \quad (11)$$

Substituting this expansion into (10) yields $$\bar{E}^v(x, y, z) = e^{-j\left(k_{ix} d_{x0} + \frac{2\pi v}{L}\right)} \bar{E}^v(x - d_{x0}, y, z). \quad (12)$$

This expression is the frequency-domain interpath relation for SDTWM structures. It can be understood as a modified Floquet boundary condition which accounts for the space-time periodicity of the modulation. From the interpath relation, the fields within neighboring stixels at frequency $f_0 + v f_s$ differ by a phase shift of $-2\pi v/L$ (in addition to the phase shift of the incident wave). This can be interpreted as a frequency-harmonic-dependent tangential momentum imparted by the modulation onto the field. The interpath relation reveals that the solution within a single stixel is sufficient to determine the solution throughout all space.

Figure 3:
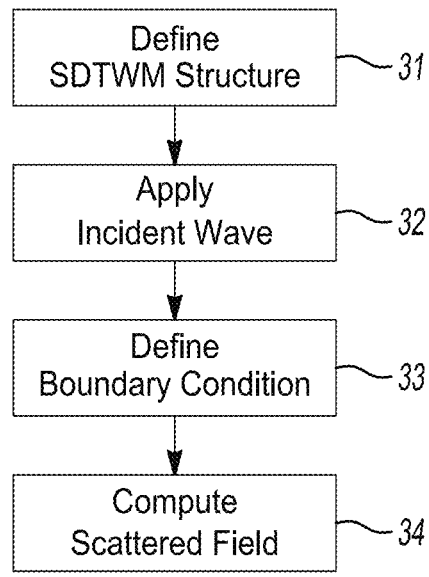
FIG. 3 is a diagram depicting a computational method for simulating a spatially-discrete traveling-wave modulated structure.

Based on the interpath relation in equation (12), a computational method for simulating a spatially-discrete traveling-wave modulated structure is presented, as shown in FIG. 3. The spatially-discrete traveling-wave modulated structure is defined at 31 by unit cells arranged periodically along one or more spatial dimensions. Each unit cell exhibits a periodic time-variation of a parameter that is delayed with respect to the periodic time-variation of the parameter exhibited by adjacent cells. The parameter may be an electromagnetic property of the unit cell such as a capacitance that varies with time. In some implementations, the parameter is further defined by electronic circuit components (e.g., varactor diodes) which comprise the unit cells.

In one example and as described in this disclosure, the spatially-discrete traveling-wave modulated structure may be divided into spatial periods. Each spatial period is further divided into multiple cells (e.g., three cells/stixels per period), such that each cell in a given spatial period exhibits a reactance that varies with time and is delayed with respect to reactance exhibited by other cells in the given spatial period. In this example, variation is assumed along only one direction (i.e., x-direction).

The spatially-discrete traveling-wave modulated structure may be realized as an electromagnetic metasurface, for example comprised of metallic patches disposed on a dielectric substrate and interconnected by varactor diodes. The techniques described herein are applicable to other traveling-wave modulated structures as well, including but not limited to traveling-wave modulated microwave transmission lines, traveling wave modulated optical structures, and other traveling-wave modulated guided-wave structures.

An incident wave of electromagnetic radiation is applied at 32 to a surface of the spatially-discrete traveling-wave modulated structure. For a given unit cell of the spatially-discrete traveling-wave modulated structure, a boundary condition at edges of the unit cell is also defined at 33, where the boundary condition relates the electromagnetic field at opposing edges of the unit cell by the phase shift of the incident wave and a frequency-harmonic dependent phase shift induced by the spatially-discrete traveling-wave modulation structure. In other words, the electromagnetic field in the unit cell can be computed as a function of the phase shift of the incident wave and a frequency-harmonic dependent phase shift induced by the spatially-discrete traveling-wave modulation structure.

In some implementations, the boundary condition can be defined without an incident wave of electromagnetic radiation being applied to the spatially-discrete traveling-wave modulated structure. An example of this case is an eigenmode simulation, in which distributions of the electric and magnetic fields supported in the absence of any sources or excitation are computed. While the method of the following description can be applied to SDTWM along 3 dimensions, it is explained here in the context of 1D SDTWM for clarity. Consider the SDTWM structure depicted in FIG. 2. Since the structure at position (x, y, z) and time t is identical to the structure at position (x−$d_{x0}$, y, z) and time t−$t_0$ (where $t_0 = T_s/L$), then Floquet's theorem can be used to show that the fields must satisfy $$\bar{\varepsilon}(x,y,z,t) = e^{j(\omega_0 t_0 - \kappa d_{x0})} \bar{\varepsilon}(x - d_{x0}, y, z, t - t_0)$$

where $\omega_0$ is an assumed signal frequency and κ is a generally complex number which is to be determined by the eigenmode simulation. Enforcing the relation above at the boundaries of a stixel is sufficient to compute field solutions that can be supported throughout the SDTWM structure.

In the example embodiment, the boundary condition is defined by the interpath relation in equation (12). That is, the boundary condition for frequency $f_0 + v f_s$ for a given unit cell is defined in accordance with $$\bar{E}^v(x, y, z) = e^{-j\left(k_{ix} d_{x0} + \frac{2\pi v}{L}\right)} \bar{E}^v(x - d_{x0}, y, z). \quad (12)$$

where v is an integer denoting the frequency harmonic index; $k_{ix}$, $k_{iy}$, and $k_{iz}$ are the x, y, and z components respectively of the wave-vector of the incident wave; $d_{x0}$, $d_{y0}$ and $d_{z0}$ are the x, y, and z dimensions respectively of a single unit cell; and L is number of cells in a segment.

In other embodiments, the boundary condition may be generalized to SDTWM along three spatial directions. In the time domain, the boundary condition for a given unit cell is defined in accordance with $$\bar{\varepsilon}(t+lt_{x0}+mt_{y0}+nt_{z0},x+ld_{x0},y+md_{y0},z+nd_{z0})=$$
$$e^{j(2\pi f_0(lt_{x0}+mt_{y0}+nt_{z0})-k_{ix}ld_{x0}-k_{iy}md_{y0}-k_{iz}nd_{z0})}$$
$$\bar{\varepsilon}(t,x,y,z), \forall l,m,n \in \mathbb{Z}$$

where $f_0$ is the frequency of the incident wave; $f_s$ is the fundamental frequency of the periodic time-variation for all unit cells cell; v is an integer denoting the frequency harmonic index; $k_{ix}$, $k_{ix}$, and $k_{iz}$ are the x, y, and z components respectively of the wave-vector of the incident wave; $d_{x0}$, $d_{y0}$ and $d_{z0}$ are the x, y, and z dimensions respectively of a single unit cell; and $t_{0x}$, $t_{0y}$, and $t_{0z}$ are the time-delays between adjacent unit cells along x, y, and z, respectively.

Alternatively, in frequency domain, the boundary condition for a given unit cell is defined in accordance with $$E(f_0+vf_s,x+ld_{x0},y+md_{y0},z+nd_{z0})=$$
$$e^{-j(k_{ix}ld_{x0}+k_{iy}md_{y0}+k_{iz}nd_{z0}+2\pi vf_s(lt_{x0}+mt_{y0}+nt_{z0}))}E(f_0+vf_s,$$
$$x,y,z), \forall l,m,n \in \mathbb{Z}$$

where $f_0$ is the frequency of the incident wave; $f_s$ is the fundamental frequency of the periodic time-variation for all unit cells cell; v is an integer denoting the frequency harmonic index; $k_{ix}$, $k_{ix}$, and $k_{iz}$ are the x, y, and z components respectively of the wave-vector of the incident wave; $d_{x0}$, $d_{y0}$ and $d_{z0}$ are the x, y, and z dimensions respectively of a single unit cell; and $t_{0x}$, $t_{0y}$, and $t_{0z}$ are the time-delays between adjacent unit cells along x, y, and z, respectively.

With continued reference to FIG. 3, the scattered electric field within the given unit cell is then computed at 34 using the boundary condition given in equation (12). More specifically, the scattered electric field can be computed using the method of moments as further described below, or by other computational methods. In this way, spatially-discrete traveling-wave modulated structures can be efficiently simulated. This technique for simulating spatially-discrete traveling-wave modulated structures are implemented by computer program instructions stored on a storage medium and performed upon execution of the computer program instructions by a computer processor.

Figure 4:
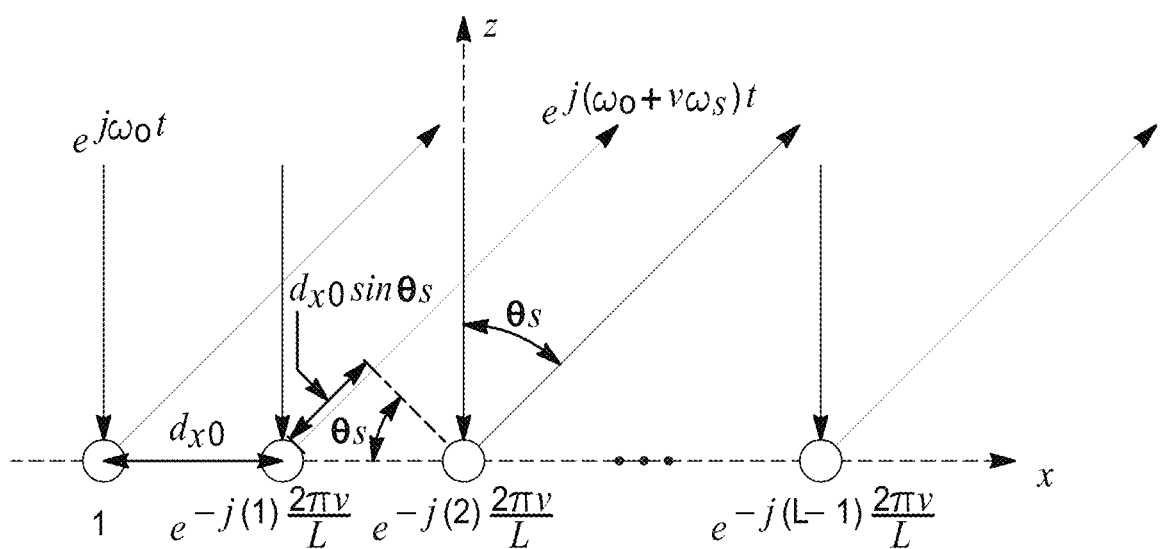
FIG. 4 is a diagram showing an array interpretation of the scattering due to a single supercell.

The interpath relation in equation (12) provides insight into the scattering behavior of SDTWM structures. Let one consider the array factor produced by a single supercell of scatterers, as shown in FIG. 4. From equation (12), the array factor for frequency $f_0+vf_s$ at observation positions in the x–z plane is given by $$ARFAC(\theta_s) = \sum_{l=0}^{L-1} e^{jl\left(-k_{ix}d_{x0}-\frac{2\pi v}{L}+\frac{\omega_0+v\omega_s}{c}d_{x0}\sin\theta_s\right)} \qquad (13)$$

where $\theta_s$ is the observation angle with respect to the z axis. The relative phase of the excitation on each scatterer is determined by the incident angle and the particular frequency of observation. The inter-element phase due to the incident wave is $k_{ix}d_{x0}$. Meanwhile, the inter-element phase induced by the SDTWM is $2\pi v/L$, where corresponds to the observed frequency of $$f_0 + vf_s = \frac{\omega_0}{2\pi} + v\frac{\omega_s}{2\pi}.$$

For simplicity, let one focus on the array factor when the excitation is normally incident ($k_{ix}=k_{iy}=0$). In this case, the array factor can be written as $$ARFAC(\theta_s) = \sum_{l=0}^{L-1} e^{jl\left(-\frac{2\pi v}{L}+\frac{\omega_0+v\omega_s}{c}d_{x0}\sin\theta_s\right)} \qquad (14)$$

From antenna array theory and equation (14), the beam-pointing direction(s) is dependent on the frequency harmonic and satisfies $$\frac{\omega_0+v\omega_s}{c}d_{x0}\sin\theta_s = \frac{2\pi v}{L}+2\pi p, \qquad (15)$$

where p is an integer. If the modulation frequency is much smaller than the RF carrier frequency, then $\omega_0+v\omega_s \approx \omega_0$. In this case, when v is replaced by v+L, the beam-pointing angle(s) remains the same (since we can replace p by p−1). This reveals that frequencies separated by $Lf_s$ are scattered to the same angle (or multiple angles). This effect, shown pictorially in FIG. 1, is not predicted when idealized continuous traveling-wave modulation is assumed. Equation (15) also reveals that if $$\frac{\omega_0+v\omega_s}{c}d_{x0} < \left|\frac{2\pi v}{L}+2\pi p\right|, \forall p \in \mathbb{Z}, \qquad (16)$$

then frequency $\omega_0+v\omega_s$ does not correspond to any propagating angles.

The interpath relation provides valuable insight into the behavior of SDTWM structures. It reveals the potential for these structures to achieve unique electromagnetic phenomena, such as sub-harmonic mixing and retro-reflective frequency conversion. By appropriately tailoring the time-dependence of a SDTWM structure (e.g. FIG. 1), the frequency of the reflected wave can be shifted by an integer multiple of $Lf_s$, where L is the number of stixels per spatial period. This effect is known as sub-harmonic mixing since the reflected wave is shifted by an integer multiple of $f_s$. Further, antenna array theory and equation (13) can be used to compute the required angle of incidence and L such that the scattered wave reflects back toward the illumination source at a translated frequency (i.e. retro-reflective frequency conversion). Finally, for structures designed theoretically via a continuous traveling-wave model, equation (15) can be used to find the maximum unit cell size such that grating lobes are not produced at any frequency in the physical implementation. This is particularly important when the modulation frequency, $f_s$, is comparable to the RF carrier frequency, $f_0$.

In addition to providing physical understanding, the inter-path relation can be used in practice to enable the simulation of SDTWM structures. For both physical and idealized models, this relation will be shown below to significantly decrease the number of unknowns by reducing the computational domain down to a single stixel: a fraction of a spatial period. The computational savings come at no cost to the accuracy of the simulation since the interpath relation does not contain any approximations. For complicated unit cell designs which require a high level of discretization to electromagnetically model, the ability to model only a single stixel can yield dramatic computational savings over the simulation of an entire spatial period (several time varying unit cells). Numerical simulations of idealized designs obtained via a continuous traveling-wave modulation model can also benefit from the interpath relation. Numerically simulating a continuous traveling-wave modulated structure without using the interpath relation requires the space-time variation to be discretized into individual, time-varying computational elements over an entire spatial period. Using the interpath relation, the computational domain for these structures can be reduced down to a single computational element: a stixel.

Figure 5:
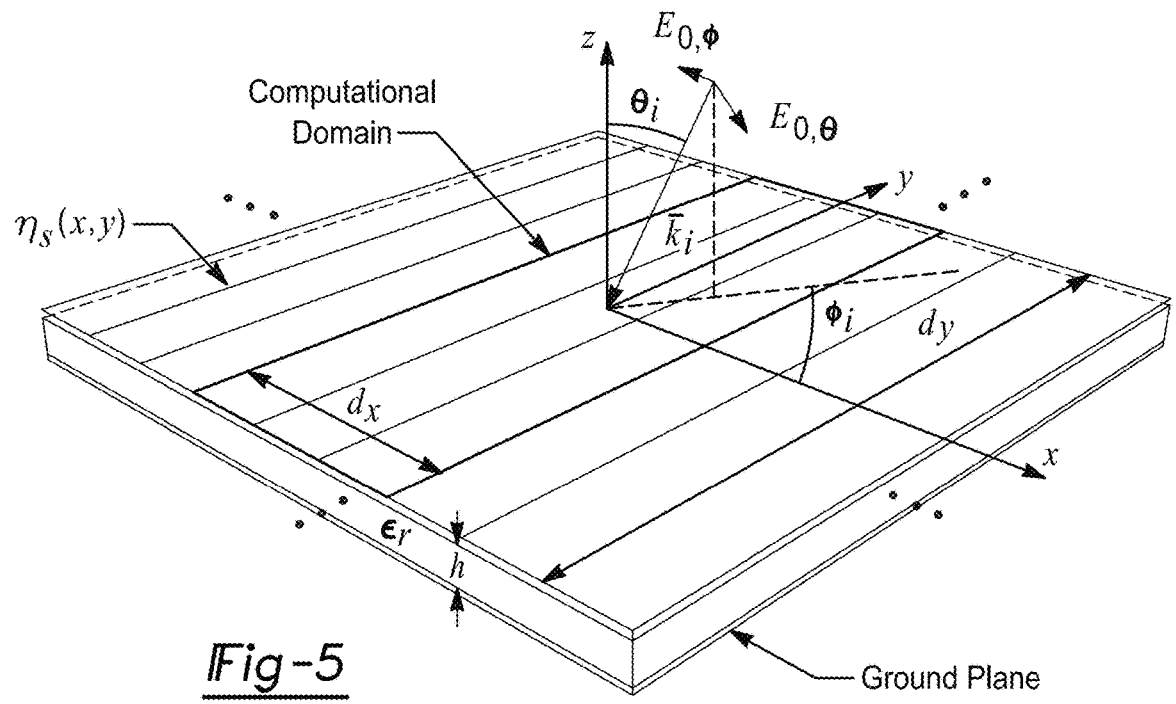
FIG. 5 illustrates a plane wave incident upon an inhomogeneous impedance sheet placed over a grounded dielectric substrate.

Next, the MoM formulation is derived for a representative SDTWM structure. While the method of moments is described herein, other numerical methods may be used as well, including but not limited to finite element method and finite difference frequency domain method. For illustration purposes, the MoM formulation is initially derived for the time-invariant structure shown in FIG. 5. The formulation for the time-invariant case will then be modified to account for SDTWM. Specifically, the MoM formulation will be derived for a periodic, inhomogeneous, time-invariant impedance sheet placed above a grounded dielectric substrate.

Here, the MoM formulation is derived for the time-invariant structure shown in FIG. 4 under a plane-wave illumination. The isotropic sheet impedance placed above the surface of the grounded dielectric substrate, $\eta_s(x, y)$, is periodic in x with period $d_x$ and in y with period $d_y$. The dielectric has a relative permittivity of $\epsilon_r$ and a thickness of h. The excitation field phasor is a plane wave of the form $$\bar{E}_i(\bar{r}) = \bar{E}_0 e^{-j\bar{k}_i \cdot \bar{r}} \tag{17}$$
$$= \bar{E}_0 e^{-j(k_{ix}x + k_{iy}y + k_{iz}z)}$$
$$= \bar{E}_0 e^{jk_0(\sin\theta_i \cos\phi_i x + \sin\theta_i \sin\phi_i y + \cos\theta_i z)}$$

The procedure used here to obtain the MoM matrix equation closely follows the formulation presented by Jin in "Theory and computation of electromagnetic fields" John Wiley & Sons (2011) for simulating a planar array of metallic patches. First, write the boundary condition for the total field on the impedance sheet and subsequently express the scattered electric field in terms of the surface current density. The boundary condition at z=0 is $$\bar{E}_t(x,y) = \eta_s(x,y)\bar{J}_s(x,y), \tag{18}$$

where $\bar{E}_t(x, y)$ denotes the transverse component of the total electric field in the x–y plane. The total electric field can be separated into the incident field produced in the absence of the impedance sheet and the field scattered by the currents induced on the impedance sheet. Note that the incident field in the absence of the impedance sheet contains both the excitation field and the field reflected from the grounded dielectric substrate. On the surface of the grounded dielectric substrate, the reflected electric field can be written as $$\bar{E}_{r,t}(x,y) = \overset{\leftrightarrow}{\Gamma} \bar{E}_{i,t}(x,y) \tag{19}$$

where $\overset{\leftrightarrow}{\Gamma} \bar{E}_{i,t}(x, y)$ is the dyadic reflection coefficient which is a function of $\theta_i$, $\phi_i$, h and $\epsilon_r$. By splitting the total electric field into incident and scattered components, equation (18) can be rewritten as $$[1+\overset{\leftrightarrow}{\Gamma}]\bar{E}_{i,t}(x,y)+\bar{E}_{s,t}(x,y)=\eta_s(x,y)\bar{J}_s(x,y) \tag{20}$$

where $\bar{E}_{i,t}$ and $\bar{E}_{s,t}$ denote the transverse components of the excitation and scattered electric field respectively. Since the structure is periodic in x and y, it follows from Floquet's Theorem that $$\bar{J}_s(x,y) = e^{-j(k_{ix}x+k_{iy}y)} \tilde{J}_s(x,y), \tag{21}$$

such that $\tilde{J}_s(x, y)$ is periodic in x with period $d_x$ and in y with period $d_y$. Since $\tilde{J}_s(x, y)$ is periodic in x and y, it can be expanded in terms of a 2D Fourier series as $$\tilde{J}_s(x,y) = \sum_{p=-\infty}^{\infty}\sum_{q=-\infty}^{\infty} \bar{I}_{pq} e^{-j(k'_{xp}x + k'_{yq}y)} \tag{22}$$

where $$k'_{xp} = \frac{2\pi p}{d_x} \text{ and } k'_{yq} = \frac{2\pi q}{d_y}.$$

Substituting this into equation (21), one obtains $$\bar{J}_s(x,y) = \sum_{p=-\infty}^{\infty}\sum_{q=-\infty}^{\infty} \bar{I}_{pq} e^{-j(k_{xp}x + k_{yq}y)} \tag{23}$$

where $k_{xp}=k_{ix}+k'_{xp}$ and $k_{yq}=k_{iy}+k'_{yq}$. One can interpret equation (23) as an expansion of the surface current density into sheet currents with uniform amplitude $\bar{I}_{pq}$ and a phase dependence similar to a plane wave. Therefore, at z=0, the transverse scattered electric field can be written as $$\bar{E}_{s,t}(x,y) = -jk_0 Z_0 \sum_{p=-\infty}^{\infty}\sum_{q=-\infty}^{\infty} \overset{\leftrightarrow}{G}(k_{xp}, k_{yq})\bar{I}_{pq} e^{-j(k_{xp}x + k_{yq}y)} \tag{24}$$

where $\overset{\leftrightarrow}{G}(k_{xp}, k_{yq})$ is the spectral-domain representation of the dyadic Green's function. Substituting the expansion for the scattered electric field into equation (20) and multiplying both sides by $e^{j(k_{ix}x+k_{iy}y)}$, one obtains $$[1+\overset{\leftrightarrow}{\Gamma}]\bar{E}_{0,t} = \eta_s(x,y)\tilde{J}_s(x,y) + jk_0 Z_0 \sum_{p=-\infty}^{\infty}\sum_{q=-\infty}^{\infty} \overset{\leftrightarrow}{G}_{pq}\bar{I}_{pq} e^{-j(k'_{xp}x + k'_{yq}y)} \tag{25}$$

where $\bar{E}_{0,t}$ is the transverse component of the excitation field amplitude, $\bar{E}_0$, and $\overset{\leftrightarrow}{G}_{pq}=\overset{\leftrightarrow}{G}(k_{xp}, k_{yq})$. Equation (25) represents an integral equation since $\bar{I}_{pq}$ is given by $$\bar{I}_{pq} = \frac{1}{d_x d_y} \int_{-\frac{d_x}{2}}^{\frac{d_x}{2}} \int_{-\frac{d_y}{2}}^{\frac{d_y}{2}} \tilde{J}_s(x,y) e^{j(k'_{xp}x + k'_{yp}y)} dxdy. \tag{26}$$

Figure 6:
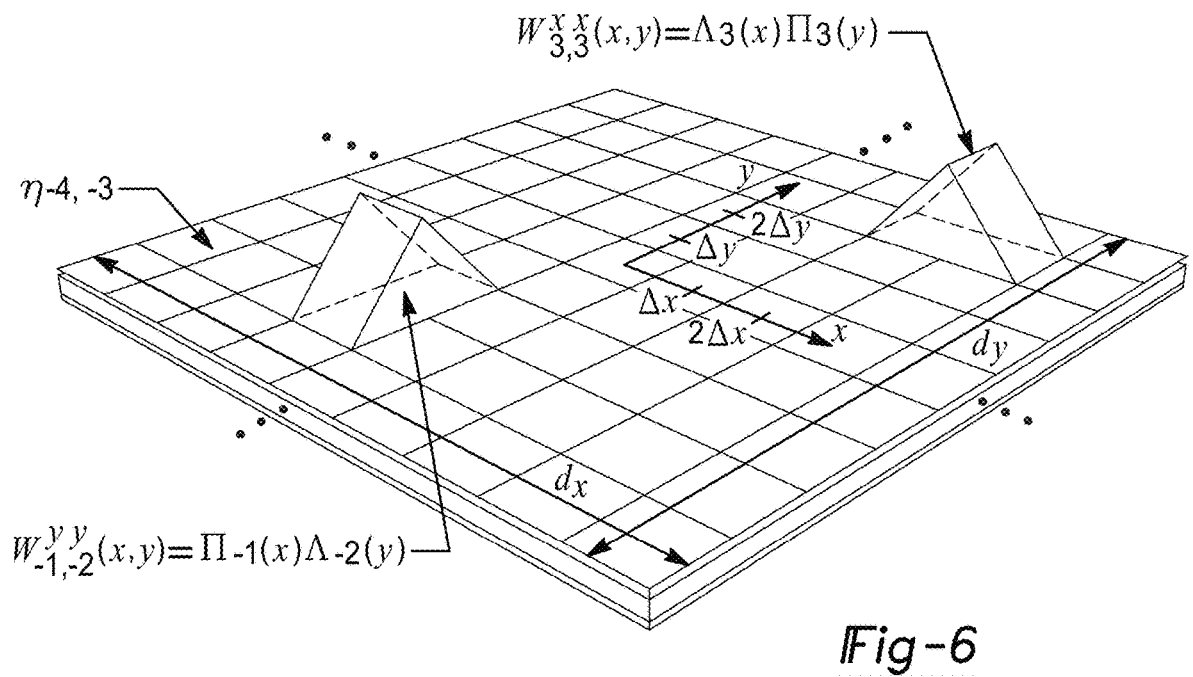
FIG. 6 illustrates an overlay of the basis functions used to expand the current within the spatial period of the structure shown in FIG. 5.

Numerically computing the surface current requires one to expand $\tilde{J}_s(x, y)$ into a set of basis functions. Following the procedure described by Jin in "Theory and computation of electromagnetic fields" John Wiley &* Sons (2011), $\tilde{J}_s(x, y)$ is expanded into basis functions with finite divergence. The basis function profile for the x component of $\bar{J}_s$, $W_{mn}^{xx}(x, y)$ and the y component of $\bar{J}_s$, $W_{mn}^{yy}(x, y)$, are shown in FIG. 6. $W_{mn}^{xx}(x, y)$ is the product of a rooftop function, $\Lambda_m$, in x and a pulse function, $\Pi_n$ in y. Meanwhile, $W_{mn}^{yy}(x, y)$ is the product of a rooftop function, $\Lambda_n$, in y and a pulse function, $\Pi_m$, in x.

$$W_{mn}^{xx}(x,y) = \Lambda_m(x)\Pi_n(y) \tag{27}$$

$$W_{mn}^{yy}(x,y) = \Pi_m(x)\Lambda_n(y) \tag{28}$$

The explicit form of these basis function is provided here as a reference. Assuming there are M=2M'+1 spatial unknowns along x and N=2N'+1 spatial unknowns along y, $$\Pi_m(x) = \begin{cases} 1, & x \in \left[\left(m-\frac{1}{2}\right)\Delta x, \left(m+\frac{1}{2}\right)\Delta x\right] \\ 0, & \text{otherwise} \end{cases} \quad (29)$$

$$\Pi_n(y) = \begin{cases} 1, & y \in \left[\left(n-\frac{1}{2}\right)\Delta y, \left(n+\frac{1}{2}\right)\Delta y\right] \\ 0, & \text{otherwise} \end{cases} \quad (30)$$

$$\Lambda_m(x) = \begin{cases} \frac{3}{2} + \frac{x}{\Delta x} - m, & x \in \left[\left(m-\frac{3}{2}\right)\Delta x, \left(m-\frac{1}{2}\right)\Delta x\right] \\ \frac{1}{2} - \frac{x}{\Delta x} + m, & x \in \left[\left(m-\frac{1}{2}\right)\Delta x, \left(m+\frac{1}{2}\right)\Delta x\right] \\ 0, & \text{otherwise} \end{cases} \quad (31)$$

$$\Lambda_n(y) = \begin{cases} \frac{3}{2} + \frac{y}{\Delta y} - n, & y \in \left[\left(n-\frac{3}{2}\right)\Delta y, \left(n-\frac{1}{2}\right)\Delta y\right] \\ \frac{1}{2} - \frac{y}{\Delta y} + n, & y \in \left[\left(n-\frac{1}{2}\right)\Delta y, \left(n+\frac{1}{2}\right)\Delta y\right] \\ 0, & \text{otherwise} \end{cases} \quad (32)$$

where $\Delta x = d_x/M$ and $\Delta y = d_y/N$. The surface current can therefore be compactly represented as $$\vec{J}_s(x,y) = \sum_{m'=-M'}^{M'} \sum_{n'=-N'}^{N'} \overleftrightarrow{W}_{m'n'}(x,y) \vec{J}_{m'n'} \quad (33)$$

where $$\overleftrightarrow{W}_{mn}(x,y) = \Lambda_m(x)\Pi_n(y)\hat{x}\hat{x} + \Pi_m(x)\Lambda_n(y)\hat{y}\hat{y} \quad (34)$$

Substitute equation (33) into equation (26) to obtain $\vec{I}_{pq}$ in terms of the weighting coefficients $\vec{J}_{m'n'}$, which yields $$\vec{I}_{pq} = \frac{1}{MN} \overleftrightarrow{T}_{pq} \sum_{m'n'} \vec{J}_{m'n'} e^{j(2\pi p m'/M + 2\pi q n'/N)}, \quad (35)$$

where $\overleftrightarrow{T}_{pq}$ represents the 2D Fourier series coefficients of $\overleftrightarrow{W}_{00}$ given by $$\overleftrightarrow{T}_{pq} = \mathrm{sinc}^2\left(\frac{p\pi}{M}\right)\mathrm{sinc}\left(\frac{q\pi}{N}\right)e^{j\frac{p\pi}{M}}\hat{x}\hat{x} + \mathrm{sinc}\left(\frac{p\pi}{M}\right)\mathrm{sinc}^2\left(\frac{q\pi}{N}\right)e^{j\frac{q\pi}{N}}\hat{y}\hat{y} \quad (36)$$

Now substitute $\vec{J}_s$ from equation (33) and $\vec{I}_{pq}$ from equation (35) into equation (25) to obtain an expression relating the incident field amplitude to the unknown current weighting coefficients.

$$[1+\vec{\Gamma}]\vec{E}_{0,t} = \sum_{m'n'} \eta_s(x,y) \overleftrightarrow{W}_{m'n'}(x,y)\vec{J}_{m'n'} + \quad (37)$$
$$j\frac{k_0 Z_0}{MN} \sum_{m'n'} \sum_{pq} e^{-j(k'_{xp} x + k'_{yq} y)} \overleftrightarrow{G}_{pq} \overleftrightarrow{T}_{pq} H^{pq}_{m'n'} \vec{J}_{m'n'}$$

where $H^{pq}_{m'n'} = e^{j(2\pi p m'/M + 2\pi q n'/N)}$ is the phase term from equation (35).

The final MoM matrix equation can be obtained by testing the left- and right-hand sides of equation (37) with $$\frac{1}{d_x d_y} \int_{-\frac{d_x}{2}}^{\frac{d_x}{2}} \int_{-\frac{d_y}{2}}^{\frac{d_y}{2}} \overleftrightarrow{W}_{mn}(x,y)\{\cdot\} dx dy \quad (38)$$

$$\forall \{m \in [-M', M'], n \in [-N', N']\}$$

Here, the Galerkin method is used, i.e., the testing functions are the same as the basis functions. The testing operation is carried out for all observation positions $(m\Delta x, n\Delta y)$ within the spatial period. To obtain an explicit form for the entries of the MoM matrix, approximate the surface impedance as a summation over pulse functions.

$$\eta_s(x,y) = \sum_{m''=-M'}^{M'} \sum_{n''=-N'}^{N'} \Pi_{m''}(x)\Pi_{n''}(y)\eta_{m''n''} \quad (39)$$

Carrying out the integrations, one obtains the final MoM matrix equation, which can be written as $$[1+\vec{\Gamma}]\vec{E}_{0,t} = \sum_{m'n'} \left(\vec{\vec{\eta}}_{mn,m'n'} + \vec{\vec{Z}}_{m-m',n-n'}\right)\vec{J}_{m'n'}, \quad (40)$$

$$\forall \{m \in [-M', M'], n \in [-N', N']\}$$

where $$\hat{x} \cdot \vec{\vec{\eta}}_{mn,m'n'} \cdot \hat{x} = \delta_{n-n'} \begin{cases} \frac{1}{6}\eta_{m-1,n}, & m' = m-1 \\ \frac{1}{3}\{\eta_{m-1,n} + \eta_{m,n}\}, & m' = m \\ \frac{1}{6}\eta_{m,n}, & m' = m+1 \\ 0, & \text{otherwise} \end{cases} \quad (41)$$

$$\hat{y} \cdot \vec{\vec{\eta}}_{mn,m'n'} \cdot \hat{y} = \delta_{m-m'} \begin{cases} \frac{1}{6}\eta_{m,n-1}, & n' = n-1 \\ \frac{1}{3}\{\eta_{m,n-1} + \eta_{m,n}\}, & n' = n \\ \frac{1}{6}\eta_{m,n}, & n' = n+1 \\ 0, & \text{otherwise} \end{cases} \quad (42)$$

$$\hat{x} \cdot \vec{\vec{\eta}}_{mn,m'n'} \cdot \hat{y} = \hat{y} \cdot \vec{\vec{\eta}}_{mn,m'n'} \cdot \hat{x} = 0 \quad (43)$$

$$\vec{\vec{Z}}_{\Delta m, \Delta n} = j\frac{k_0 Z_0}{MN} \sum_{pq} \overleftrightarrow{T}^*_{pq} \overleftrightarrow{G}_{pq} \overleftrightarrow{T}_{pq} e^{-j2\pi\left(\frac{p\Delta m}{M} + \frac{q\Delta n}{N}\right)}. \quad (44)$$

In summary, equation (40) is the MoM matrix equation corresponding to the structure shown in FIG. 4. Using Floquet's theorem, the periodicity in space was exploited such that unknowns are only placed within a single spatial period. For each observation position $(m\Delta x, n\Delta y)$ within a spatial period, $\vec{\vec{\eta}}_{mn,m'n'}$ represents the overlap integral between the testing function at the observation position, the surface impedance distribution and the basis functions. Since the system is linear and time-invariant (LTI), this term contains no interactions between fields of different frequencies. Meanwhile, the interactions due to the surrounding medium are captured by the matrix $\vec{\vec{Z}}_{m-m',n-n'}$. Since the surrounding medium is LTI, this term also does not contain any interactions between fields of different frequencies.

Figure 7:
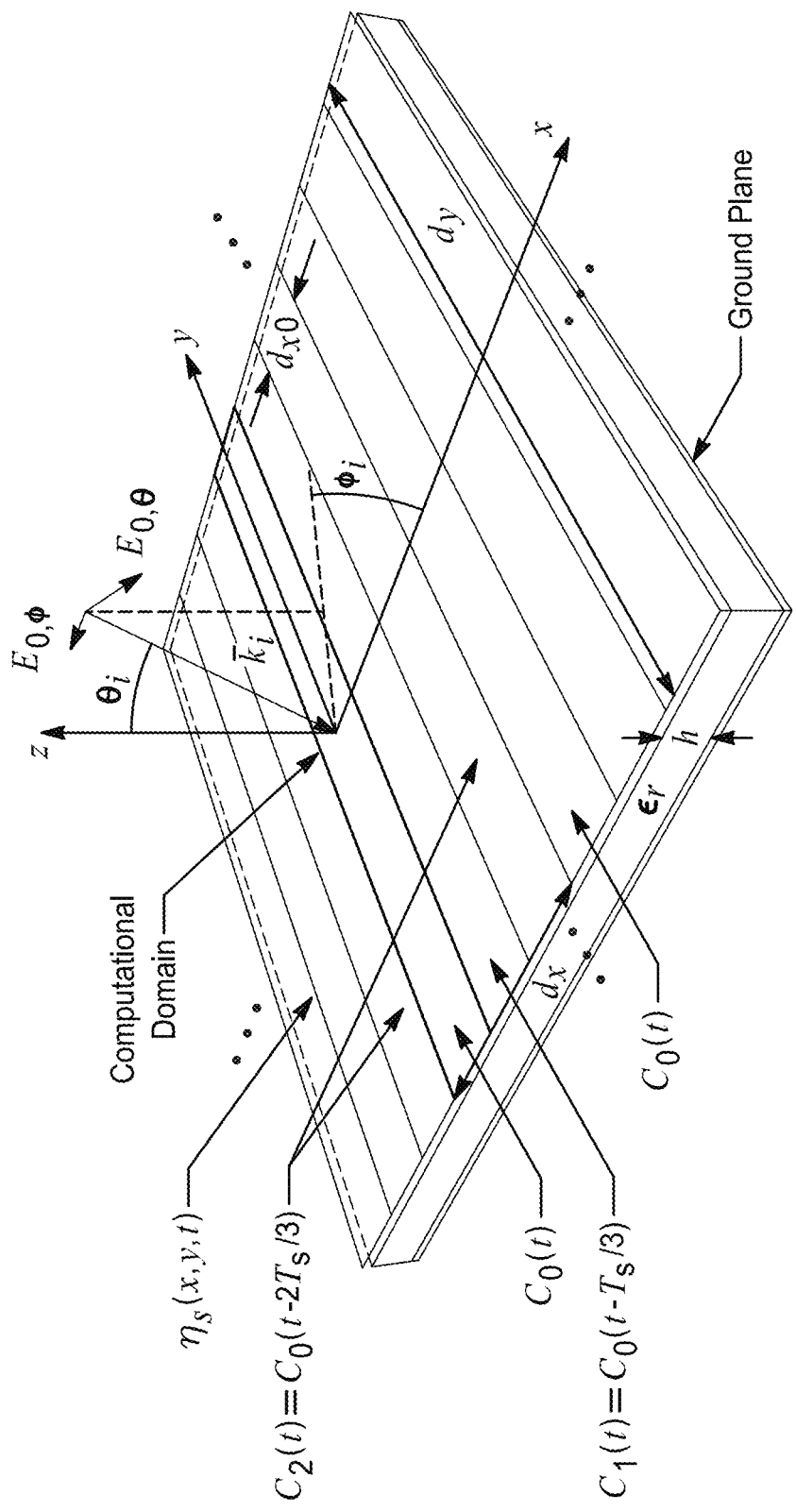
FIG. 7 illustrates an example of an SDTWM structure with a delay of Ts/3 between adjacent stixels.

Next, the MoM formulation for the SDTWM structure shown in FIG. 7 will be derived. However, it should be noted that the following procedure can be applied to the simulation of other SDTWM structures. The MoM formulation will be obtained by modifying the time-invariant analysis described above to account for a SDTWM impedance sheet. The interpath relation in equation (12) will be used to construct basis functions such that unknowns will only need to be placed within a single stixel. Therefore, the following analysis procedure reduces the number of unknowns by a factor of L, the number of stixels in a supercell.

The structure in FIG. 7 consists of time-varying capacitive strips placed on the surface of a grounded dielectric substrate. The time variation of the capacitance within each stixel is staggered in time. That is, the sheet capacitance in stixel l, $C_l(t)$, satisfies $$C_l(t) = C_{l-1}\left(t - \frac{T_s}{L}\right), \quad (45)$$

where L is the number of stixels in a supercell. The space-time dependent sheet capacitance over the entire supercell can then be written $$C(x, t) = C_l(t), \quad x \in \left[\left(l - \frac{1}{2}\right)d_{x0}, \left(l + \frac{1}{2}\right)d_{x0}\right). \quad (46)$$

The excitation field is the same as above, and can be written in the time-domain as $$\bar{\varepsilon}_i(\bar{r}, t) = \bar{E}_0 e^{j(\omega_0 t - \bar{k}_i \cdot \bar{r})} \quad (47)$$
$$= \bar{E}_i(\bar{r}) e^{j\omega_0 t}$$

Similar to the time-invariant formulation, first write the boundary condition for the total field at z=0. For a sheet capacitance, this boundary condition is given by $$\frac{\partial}{\partial t}\{C_t(x, t)\bar{\varepsilon}_t(x, y, t)\} = \bar{\mathcal{J}}_s(x, y, t), \quad (48)$$

where $\bar{\varepsilon}_t(x, y, t)$ denotes the transverse component of the total time-dependent electric field. However, for this formulation, it is simpler to implement the following, equivalent boundary condition $$\bar{\varepsilon}_t(x, y, t) = \frac{1}{c(x, t)}\int \bar{\mathcal{J}}_s(x, y, t) dt \quad (49)$$
$$= \frac{j\omega_0}{j\omega_0 C(x, t)}\int \bar{\mathcal{J}}_s(x, y, t) dt$$
$$= \eta_S(x, y, t) j\omega_0 \int \bar{\mathcal{J}}_s(x, y, t) dt$$

where $\eta_s(x, y, t) \triangleq 1/j\omega_0 C(x, t)$ is the effective time-varying surface impedance. Since $C(x, t)$ is a periodic function in time, $\eta_s(x, y, t)$ is also periodic, and can be expanded in a Fourier series as $$\eta_s(x, y, t) = \sum_{v=-\infty}^{\infty} \eta_s^v(x, y) e^{jv\omega_s t}. \quad (50)$$

Further, since the excitation field in equation (47) has a time dependence of $e^{j\omega_0 t}$ and the structure is an LPTV system, the electric field and surface current density can be written as $$\bar{\varepsilon}_t(x, y, t) = \sum_{v=-\infty}^{\infty} \bar{E}_t^v(x, y) e^{j(\omega_0 + v\omega_s)t} \quad (51)$$
$$\bar{\mathcal{J}}_s(x, y, t) = \sum_{v'=-\infty}^{\infty} \bar{\mathcal{J}}_s^{v'}(x, y) e^{j(\omega_0 + v'\omega_s)t}$$

Note that this implies $$j\omega_0 \int \bar{\mathcal{J}}_s(x, y, t) dt = \sum_{v'=-\infty}^{\infty} \frac{\bar{\mathcal{J}}_s^{v'}(x, y)}{1 + v'\frac{\omega_s}{\omega_0}} e^{j(\omega_0 + v'\omega_s)t} \quad (52)$$

Substituting this expression into equation (49) yields $$\bar{E}_t^v(x, y) = \sum_{v'=-\infty}^{\infty} \frac{\eta_s^{v-v'}(x, y)}{1 + v'\frac{\omega_s}{\omega_0}} \bar{\mathcal{J}}_s^{v'}(x, y). \quad (53)$$

This is expected since a product in the time-domain results in convolution in the frequency-domain. Equation (53) is the boundary condition use in the MoM formulation. Note the similarity between this expression and equation (18). In effect, equation (53) will yield an integral equation for each "observed" frequency harmonic, v, which is coupled to all "source" frequency harmonics, v', through the surface impedance. Now split the total electric field harmonics into incident and scattered components. In the time-domain, the field reflected by the grounded dielectric substrate is given by $$\bar{\varepsilon}_{r,t}(x,y,t) = \overleftrightarrow{\Gamma} \bar{\varepsilon}_{i,t}(x,y,t) \quad (54)$$

where $\overleftrightarrow{\Gamma}$ is the dyadic reflection coefficient which is a function of $\theta_i$, $\phi_i$, h and $\epsilon_r$. Splitting the total field in equation (53) into incident and scattered components, one obtains $$[1 + \overleftrightarrow{\Gamma}]\bar{E}_{i,t}(x, y)\delta_v + \bar{E}_{s,t}^v(x, y) = \sum_{v'=-\infty}^{\infty} \frac{\eta_s^{v-v'}(x, y)}{1 + v'\frac{\omega_s}{\omega_0}} \bar{\mathcal{J}}_s^{v'}(x, y) \quad (55)$$

where $\bar{E}_{i,t}(x, y)$ is the transverse component of $\bar{E}_i(\bar{r})$ in equation (47) and $\bar{E}_{s,t}^v(x, y)$ is the transverse component of the $v^{th}$ frequency harmonic of the scattered electric field. The Kronecker delta function which multiplies the incident field in equation (55) results from the monochromatic excitation.

The scattered electric field frequency harmonics are expressed in terms of the surface current density. Because the surrounding medium is time-invariant (only the surface impedance is time-dependent), the scattered field at frequency $f_0 + vf_s$ only depends on the induced current at the same frequency. Since the supercell is periodic in x and y, it follows from Floquet's theorem that $$\bar{\mathcal{J}}_s^v(x,y) = e^{-j(k_{ix}x + k_{iy}y)}\bar{J}_s^v(x,y), \quad (56)$$

where $\bar{J}_s^\nu(x, y)$ is a periodic function in x with period $d_x$ and in y with period $d_y$. Since $\bar{J}_s^\nu(x, y)$ is periodic in x and y, it can be expanded in terms of 2D Fourier series as $$\bar{J}_s^\nu(x, y) = \sum_{p=-\infty}^{\infty} \sum_{q=-\infty}^{\infty} \bar{T}_{pq}^\nu e^{-j(k'_{xp}x + k'_{yq}y)}, \quad (57)$$

where $$k'_{xp} = \frac{2\pi p}{d_x} \text{ and } k'_{yq} = \frac{2\pi q}{d_y}.$$

Substituting this into equation (56), one obtains $$\bar{J}_s^\nu(x, y) = \sum_{p=-\infty}^{\infty} \sum_{q=-\infty}^{\infty} \bar{T}_{pq}^\nu e^{-j(k_{xp}x + k_{yq}y)}, \quad (58)$$

where $k_{xp} = k_{ix} + k'_{xp}$, and $k_{yq} = k_{iy} + k'_{yq}$. Equation (58) can be interpreted as a superposition of planar current sheets of the form $\bar{J}_0 e^{-j(k_x x + k_y y)}$. Therefore, the electric field scattered by the surface current density can be written as $$\bar{E}_{s,t}^\nu(x, y) = -jk_0 Z_0 \sum_{p=-\infty}^{\infty} \sum_{q=-\infty}^{\infty} \overleftrightarrow{G}^\nu(k_{xp}, k_{yq}) \bar{T}_{pq}^\nu e^{-j(k_{xp}x + k_{yq}y)} \quad (59)$$

where $\overleftrightarrow{G}^\nu(k_{xp}, k_{yq})$ is the spectral-domain representation of the dyadic Green's function evaluated at frequency $f_0 + \nu f_s$. Substituting the expansion for the scattered electric field into equation (55) and multiplying both sides by $e^{j(k_{ix}x + k_{iy}y)}$, we obtain $$[1 + \overleftrightarrow{\Gamma}] \bar{E}_{0,t} \delta_\nu = \sum_{\nu'=-\infty}^{\infty} \frac{\eta_s^{\nu-\nu'}(x, y)}{1 + \nu' \frac{\omega_s}{\omega_0}} \bar{J}_s^{\nu'}(x, y) + \quad (60)$$

$$jk_0 Z_0 \sum_{p=-\infty}^{\infty} \sum_{q=-\infty}^{\infty} \overleftrightarrow{G}_{pq}^\nu \bar{T}_{pq}^\nu e^{-j(k'_{xp}x + k'_{yq}y)}$$

where $\bar{E}_{0,t}$ is the transverse component of the excitation field amplitude and $\overleftrightarrow{G}_{pq}^\nu = \overleftrightarrow{G}^\nu(k_{xp}, k_{yq})$. Equation (60) represents our integral equation since $\bar{T}_{pq}^\nu$ is computed via a spatial integral over the supercell $$\bar{T}_{pq}^\nu = \frac{1}{d_x d_y} \int_{-\frac{d_{x0}}{2}}^{d_x - \frac{d_{x0}}{2}} \int_{-\frac{d_y}{2}}^{\frac{d_y}{2}} \bar{J}_s^\nu(x, y) e^{j(k'_{xp}x + k'_{yq}y)} dx dy. \quad (61)$$

Numerically computing the current requires one to expand $\bar{J}_s^\nu(x, y)$ into a set of basis functions. Up to this point, the symmetry of the SDTWM structure has not been utilized. Using the same basis functions as those described above would require current weighting coefficients through the entire supercell. However, from the interpath relation in equation (12), it is clear that the fields in a single stixel should be sufficient to solve the entire problem. Thus, to reduce the number of unknowns required to simulate the structure, the basis functions applied to the time-invariant problem above are modified. The modified basis will be constructed such that: current weighting coefficients only need to be placed within a single stixel; and the modified basis functions satisfy the interpath relation in equation (12).

Define $\overleftrightarrow{W}_{mn}(x, y)$ to be the same as in equations (27) through (32). However, the computational grid is required to be identical within each stixel. Therefore, redefine M as the number of computational elements within a stixel (rather than a spatial period). This re-scales the width of the computational elements to be $\Delta x = d_{x0}/M$ rather than $d_x/M$.

Figure 8:
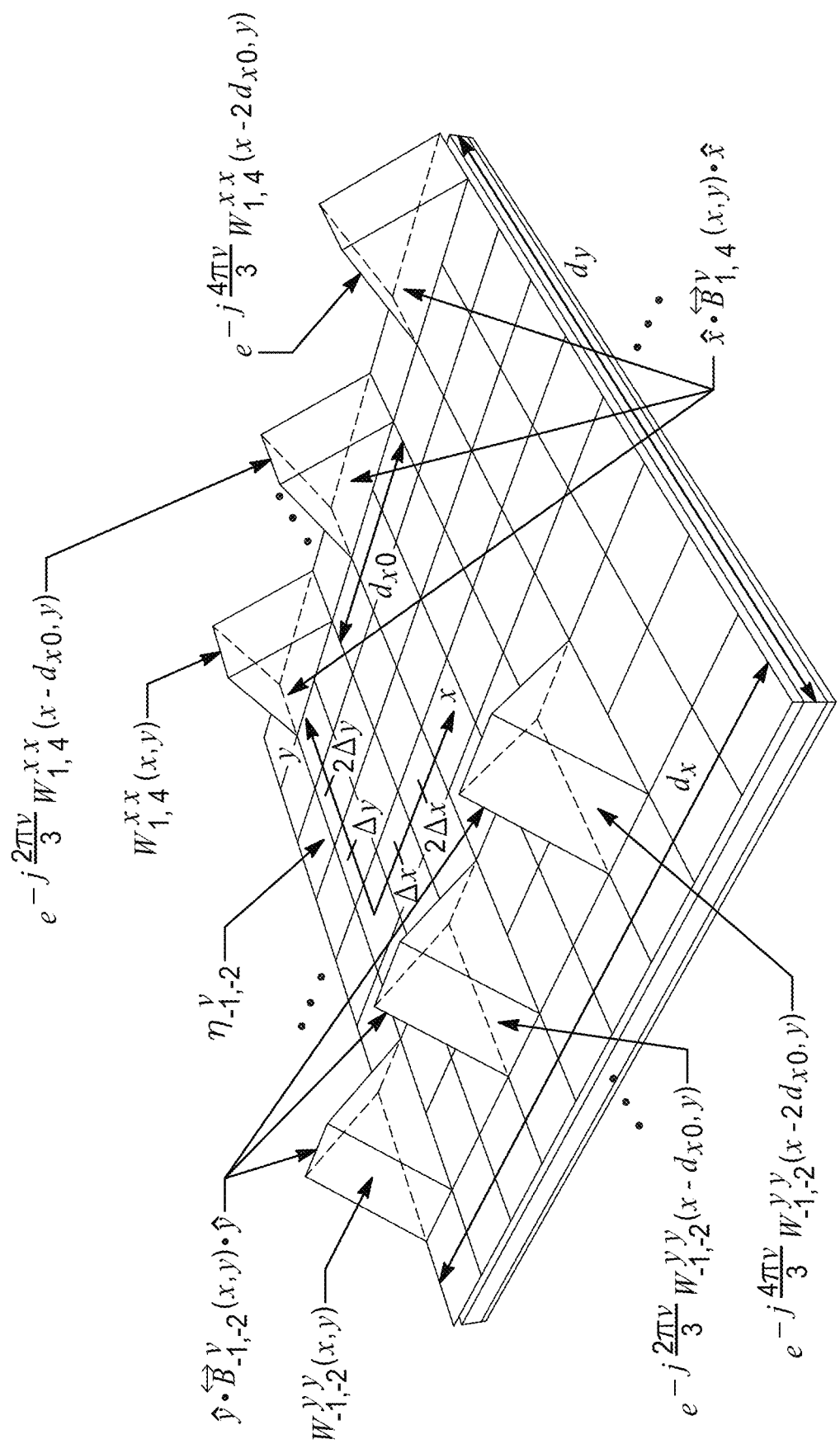
FIG. 8 illustrates an overlay of the basis functions used to expand the current within a supercell of the structure shown in FIG. 7.

Now construct a new basis function $\overleftrightarrow{B}_{m'n'}^\nu(x, y)$, shown in FIG. 8, which is given by $$\overleftrightarrow{B}_{m'n'}^\nu(x, y) = \sum_{l=0}^{L-1} e^{-j\frac{2\pi\nu l}{L}} \overleftrightarrow{W}_{m'n'}(x - l d_{x0}, y) \quad (62)$$

This basis function automatically applies the impressed phase obtained from the interpath relation of $-2\pi\nu l/L$ to the current within stixel l. The expansion of $\bar{J}_s^\nu(x, y)$ in terms of basis functions $\overleftrightarrow{B}_{m'n'}^\nu(x, y)$ is given by $$\bar{J}_s^\nu(x, y) = \sum_{n=-N'}^{N'} \sum_{m=-M'}^{M'} \overleftrightarrow{B}_{m'n'}^\nu(x, y) \bar{j}_{m'n'}^\nu \quad (63)$$

Substitute this expansion into equation (61) to obtain $\bar{T}_{pq}^\nu$ in terms of the weighting coefficients $\bar{J}_{m'n'}^\nu$, which yields $$\bar{T}_{pq}^\nu = \frac{\overleftrightarrow{T}_{pq}}{LMN} \sum_{m'n'} \sum_{l=0}^{L-1} e^{j\frac{2\pi(p-\nu)l}{L}} \bar{j}_{m'n'}^\nu e^{j\left(\frac{2\pi pm'}{LM} + \frac{2\pi qn'}{N}\right)}, \quad (64)$$

where $\overleftrightarrow{T}_{pq}$ represents the 2D Fourier series coefficients of $\overleftrightarrow{W}_{00}$ given by $$\overleftrightarrow{T}_{pq} = \mathrm{sinc}^2\left(\frac{p\pi}{LM}\right)\mathrm{sinc}\left(\frac{q\pi}{N}\right)e^{j\frac{p\pi}{LM}} \hat{x}\hat{x} + \mathrm{sinc}\left(\frac{p\pi}{LM}\right)\mathrm{sinc}^2\left(\frac{q\pi}{N}\right)e^{j\frac{q\pi}{N}} \hat{y}\hat{y} \quad (65)$$

The factor of 1/L in equation (64) and equation (65) results from an effective increase in discretization by a factor of L. This expression can be further simplified by noting $$\sum_{l=0}^{L-1} e^{j\frac{2\pi(p-\nu)l}{L}} = \begin{cases} L, & p - \nu = p'L, p' \in \mathbb{Z} \\ 0, & \text{otherwise} \end{cases} \quad (66)$$

If one defines $$g_p^\nu = \begin{cases} 1, & p - \nu = p'L, p' \in \mathbb{Z} \\ 0, & \text{otherwise} \end{cases} \quad (67)$$

then the summation over l (the stixels) in equation (64) can be eliminated. Thus equation (64) can be written as $$\bar{T}_{pq}^\nu = \frac{\overleftrightarrow{T}_{pq}}{MN} \sum_{m'n'} g_p^\nu \bar{j}_{m'n'}^\nu e^{j(2\pi pm'/LM + 2\pi qn'/N)}. \quad (68)$$

Substitute $\bar{J}_s^v$ from equation (63) and $\bar{I}_{pq}^v$ from equation (68) into equation (60) to obtain an expression relating the incident field amplitude to the unknown current weighting coefficients.

$$[1+\vec{\Gamma}]\bar{E}_{0,t}\delta_v = \sum_{v'}\sum_{m'n'}\frac{\eta_s^{v-v'}(x,y)}{1+v'\frac{\omega_s}{\omega_0}}\overleftrightarrow{B}_{m'n'}^v(x,y)\bar{J}_{m'n'}^{v'} + \quad (69)$$

$$j\frac{k_0 Z_0}{MN}\sum_{m'n'}\sum_{pq}e^{-j(k'_{xp}x+k'_{yq}y)}g_p^v\overleftrightarrow{G}_{pq}^v\overleftrightarrow{T}_{pq}H_{m'n'}^{pq}\bar{J}_{m'n'}^v,$$

where $H_{m'n'}^{pq}=e^{j(2\pi pm'/LM+2\pi qn'/N)}$ is the phase term from equation (68). It is worth noting the similarity between this expression and equation (37). The first term on the right-hand side of equation (69) now includes a summation over source frequencies $f_0+v'f_s$, representing the coupling between frequencies introduced by the time-varying impedance sheet. Meanwhile, the only difference in the second term of these two equations is the factor $g_p^v$ which captures the induced tangential momentum imparted by the SDTWM.

The final MoM matrix equation can be obtained by testing the left- and right-hand sides of equation (69) for observation points within a single stixel $$\frac{1}{d_x d_y} \quad (70)$$

$$\int_{-\frac{d_{x0}}{2}}^{d_x-\frac{d_{x0}}{2}}\int_{-\frac{d_y}{2}}^{\frac{d_y}{2}}\overleftrightarrow{W}_{mn}(x,y)\{\cdot\}dx dy \; \forall \; \{m \in [-M', M'], n \in [-N', N']\}.$$

Note that, while the integral bounds span the entire supercell, the observation positions (m$\Delta$x, n$\Delta$y) are limited to a single stixel. For this implementation, approximate the surface impedance frequency harmonics as summations over pulse functions.

$$\eta_s^v(x,y) = \sum_{m''=-M'}^{M'}\sum_{n''=-N'}^{N'}\Pi_{m''}(x)\Pi_{n''}(y)\eta_{m''n''}^v \quad (71)$$

Carrying out the integrations, obtain the final MoM matrix equation, which can be written as $$[1+\vec{\Gamma}]\bar{E}_{0,t}\delta_v = \sum_{v'}\sum_{m'n'}\left(\frac{\overleftrightarrow{\eta}_{mn,m'n'}^{v-v'}}{1+v'\frac{\omega_s}{\omega_0}} + \overleftrightarrow{Z}_{m-m',n-n'}^{v'}\delta_{v-v'}\right)\bar{J}_{m'n'}^{v'} \quad (72)$$

$\forall \; \{m \in [-M', M'], n \in [-N', N']\},$ where $$\hat{x}\cdot\overleftrightarrow{\eta}_{mn,m'n'}^v\cdot\hat{x} = \delta_{n-n'}\begin{cases}\frac{1}{6}\eta_{m-1,n}^v, & m'=m-1 \\ \frac{1}{3}\{\eta_{m-1,n}^v+\eta_{m,n}^v\}, & m'=m \\ \frac{1}{6}\eta_{m,n}^v, & m'=m+1 \\ 0, & \text{otherwise}\end{cases} \quad (73)$$

$$\hat{y}\cdot\overleftrightarrow{\eta}_{mn,m'n'}^v\cdot\hat{y} = \delta_{m-m'}\begin{cases}\frac{1}{6}\eta_{m,n-1}^v, & n'=n-1 \\ \frac{1}{3}\{\eta_{m,n-1}^v+\eta_{m,n}^v\}, & n'=n \\ \frac{1}{6}\eta_{m,n}^v, & n'=n+1 \\ 0, & \text{otherwise}\end{cases} \quad (74)$$

$$\hat{x}\cdot\overleftrightarrow{\eta}_{mn,m'n'}^v\cdot\hat{y} = \hat{y}\cdot\overleftrightarrow{\eta}_{mn,m'n'}^v\cdot\hat{x} = 0 \quad (75)$$

and $$\overleftrightarrow{Z}_{\Delta m,\Delta n}^v = j\frac{k_0 Z_0}{MN}\sum_{pq}g_p^v\overleftrightarrow{T}_{pq}^*\overleftrightarrow{G}_{pq}^v\overleftrightarrow{T}_{pq}e^{-j2\pi\left(\frac{p\Delta m}{LM}+\frac{q\Delta n}{N}\right)} \quad (76)$$

$$= j\frac{k_0 Z_0}{MN}e^{-j\frac{2\pi v\Delta m}{LM}}\sum_{p'q}\overleftrightarrow{\leftrightarrow}_{p'q}^v e^{-j2\pi\left(\frac{p'\Delta m}{M}+\frac{q\Delta n}{N}\right)}$$

$$\overleftrightarrow{\leftrightarrow}_{p'q}^v = \overleftrightarrow{T}_{p'L+v_e,q}^*\overleftrightarrow{G}_{p'L+v_e,q}^v\overleftrightarrow{T}_{p'L+v_e,q} \quad (77)$$

$$v_e = \text{mod}(v, L) \quad (78)$$

In summary, equation (72) represents the MoM matrix equation corresponding to the structure shown in FIG. 7. Due to the interpath relation, unknowns only need to be placed within a single stixel (as opposed to the entire supercell). For each observed frequency $f_0+vf_s$ and position (m$\Delta$x, n$\Delta$y) within a single stixel, $\overleftrightarrow{\eta}_{mnm'n'}^{v-v'}$ represents the overlap integral between the testing function at the observation position, the spatial distribution of frequency harmonic v−v' of the effective time-varying surface impedance, and the basis functions corresponding to source frequency $f_0+v'f_s$. Since the surface impedance is LPTV, this term captures the interactions between fields of different frequencies. Meanwhile, the interactions due to the surrounding medium are captured by the matrix $\overleftrightarrow{Z}_{m-m',n-n'}^{v'}$. Since the surrounding medium is LTI, this term is only included when the observed frequency is equal to the source frequency (as denoted by $\delta_{v-v'}$).

The interpath relation serves to reduce the required number of unknowns in the MoM matrix equation. It is clear that, without invoking the interpath relation, the number of unknowns would have scaled as O(UNLM), where U—number of simulated frequency harmonics
N—number of unknowns along y within a spatial period
L—number of stixels per supercell
M—number of unknowns along x within a single stixel.

By including the interpath relation, the number of unknowns scales as O(UNM), reducing the problem size by a factor of L. Structures built to mimic continuous traveling-wave modulation require an appreciable number of stixels per spatial modulation period. In these scenarios, the reduction in unknowns which results from shrinking the computational domain to a single stixel would be particularly significant.

Numerical results of the MoM formulation presented for the structure shown in FIG. 7 are validated and discussed. Various capabilities are achieved by considering the metasurface in FIG. 7 as a space-time reflection phase modulator. Consider a uniform sheet capacitance, C, placed on top of a grounded dielectric substrate. For a given polarization and incidence angle, it can be shown that the reflection phase, $\phi$, satisfies $$\tan\frac{\phi^{TX}}{2} = -Z_0^{TX}\omega_0 C_0^{TX}\Delta_C \qquad (79)$$

where the superscript TX refers to either $TE_z$ or $TM_z$ polarization, $Z_0^{TX}$ is the tangential wave impedance in free space, $\omega_0$ is RF frequency, $C_0^{TX}$ is the resonant value of capacitance for each polarization, and $\Delta_C$ is defined such that $C=C_0^{TX}(1+\Delta_C)$. Therefore, given a desired phase variation, equation (79) can be used to find the required capacitance variation.

Three modulation examples of the structure shown in FIG. 7 are examined below. Note that, for all examples, the capacitance is assumed to be spatially uniform over each stixel. Further, $\bar{k}_i$ is assumed to be in the x–z plane ($k_{iy}=0$). The problem descriptions for each of the three modulations are summarized in Table I.

|  | Case | | |
|---|---|---|---|
|  | A | B | C |
| RF Carrier Frequency ($f_0$) | 10 GHz | 10 GHz | 10 GHz |
| Incident Angle ($\theta_i$) | 25° | 25° | 25° |
| Modulation Frequency ($f_s$) | 25 kHz | 25 kHz | 500 MHz |
| Stixel Width ($d_{x0}$) | $\lambda_0/5$ | $\lambda_0/5$ | $\lambda_0/10$ |
| Dielectric Thickness (h) | 0.508 mm | 0.508 mm | 0.508 mm |
| Stixels per Supercell (L) | 20 | 3 | 60 |
| Capacitance Waveform | Sawtooth phase | Sawtooth phase | sinusoidal |

First, the time-variation of the capacitance is designed to produce a sawtooth reflection phase. There are 20 stixels of width $\lambda_0/5$ per supercell. The convergence of the MoM formulation is examined, and the results are validated using a spectral-domain method derived in "Space-time-modulated metasurfaces with spatial discretization: Free-space N-path systems" Physical Review Applied. Next, the capacitance variation again produces a sawtooth reflection phase. However, in this case, each supercell contains only 3 stixels (becoming subwavelength) and subharmonic mixing can be observed. Finally, a sinusoidal capacitance is applied such that the reflected field contains no power at the fundamental frequency or in the spectral direction. In this example, each supercell contains 60 stixels of width $\lambda_0/10$, highlighting the capability of the MoM formulation to efficiently simulate continuous designs.

To examine the accuracy and convergence of the proposed method, we can define the error energy between two given solutions in the spectral-domain. From the interpath relation, it can be shown that the fields corresponding to a SDTWM structure are written in terms of a compressed double Floquet expansion. Assuming that there is no variation along y, the transverse component of the scattered electric field at z=0 can be expanded as $$\bar{E}_{s,t}(x,y,t) = e^{j(\omega_0 t - k_{ix}x)}\sum_{p'=-\infty}^{\infty}\sum_{v=-\infty}^{\infty}\bar{E}_{p'}^v \, e^{jv\left(\omega_s t - \frac{2\pi}{d_x}x\right)}e^{-j\frac{2\pi p'}{d_{x0}}x} \qquad (80)$$

This is the expansion employed in the spectral-domain method, detailed by Z. Wu, C. Scarborough, and A. Grbic in "Space-time-modulated metasurfaces with spatial discretization: Free-space N-path systems" Physical Review Applied, that will be used to determine the accuracy of the MoM formulation. In contrast to the presented MoM technique, the spectral-domain method uses the space-time Fourier series coefficients of the impedance sheet and fields to compute the scattered fields. From the weighting coefficients, $\mathbf{J}_{m'n'}^v$, computed by the MoM solver, the spectral expansion of the field can be obtained in this form using equation (68) and equation (59). Thus, given two solutions for the spectral-domain electric field coefficients, $\bar{E}_{p'}^{v(1)}$ and $\bar{E}_{p'}^{v(2)}$, define the error energy as $$\Delta(\bar{E}^{(1)}, \bar{E}^{(2)}) = \sqrt{\frac{\sum_{v=-U'}^{U'}\sum_{p'=-P'}^{P'}|\bar{E}_{p'}^{v(1)} - \bar{E}_{p'}^{v(2)}|^{U'}}{\sum_{v=-U'}^{U'}\sum_{p'=-P'}^{P'}|\bar{E}_{p'}^{v(2)}|^2}}. \qquad (81)$$

Throughout this section, the summations in equation (81) are truncated such that U'=P'=30.

Here, the convergence and accuracy of the solution obtained by the MoM formulation is examined when the metasurface is modulated as described in case A of Table I. The size of each supercell is given by $d_x=Ld_{x0}=4\lambda_0$. In this limit, the sawtooth phase modulation waveform results in a Blaze grating in both space and time. As a result, one expects the reflected power to be up-converted in frequency and deflected away from the specular direction. The convergence is studied by computing the error energy in equation (81) between the solution for a given number of spatial/spectral unknowns and the solution using the most spatial/spectral unknowns. The accuracy of the formulation is determined by the error energy between the spectral-domain method and the presented MoM formulation using the most spatial/spectral unknowns.

Figure 9:
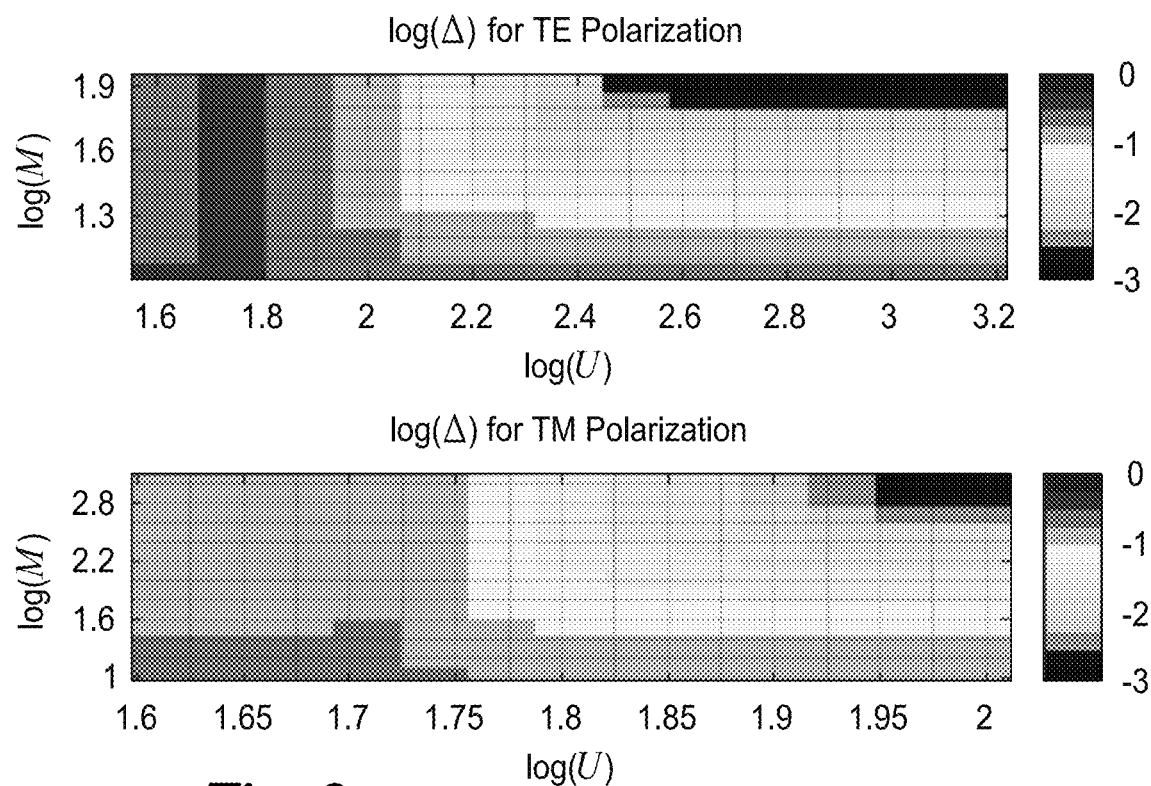
FIG. 9 is heat charts showing the error energy in the electric field harmonic coefficients computed by the MoM solver compared to the finest solution, where the number of frequency harmonics is denoted by U while the number of spatial samples is denoted by M.

For a given number of spatial unknowns, M, and spectral unknowns, U, define $\bar{E}^{(M,U)}$ as the spectral coefficients obtained from the MoM solver. Then define the error energy in equation (81) with respect to discretization as $\Delta(\bar{E}^{(M,U)}, \bar{E}^{(M_0,U_0)})$ where $M_0$ and $U_0$ are the maximum simulated values of M and U in the convergence study. The solutions for $TE_z$ and $TM_z$ illumination require different numbers of spatial and spectral unknowns to converge. For the $TE_z$ convergence study, $M_0=81$ and $U_0=1,441$. Meanwhile, for the $TM_z$ convergence study, $M_0=999$ and $U_0=99$. In FIG. 9, the error energy is shown as a function of M and U for both polarizations. For $TE_z$ polarization, M=55 spatial samples and U=323 frequency harmonics were required to reduce the error energy below 0.01. Meanwhile, for $TM_z$ polarization, M=465 spatial samples and U=79 frequency harmonics were required to reduce the error energy below 0.01. The large number of required unknowns highlights the importance of using the interpath relation to solve SDTWM systems. For example, the total number of unknowns needed for the $TE_z$ case is $2\times55\times323\approx36\times10^3$. Without including the interpath relation, the total number of unknowns would have been $20\times2\times55\times323\approx711\times10^3$. Despite taking advantage of the inherent sparsity of the matrix system, it would require about 36 GB just to store such a matrix using double precision floating point representation. Meanwhile, the interpath relation reduces this requirement to 0.61 GB.

Figure 10:
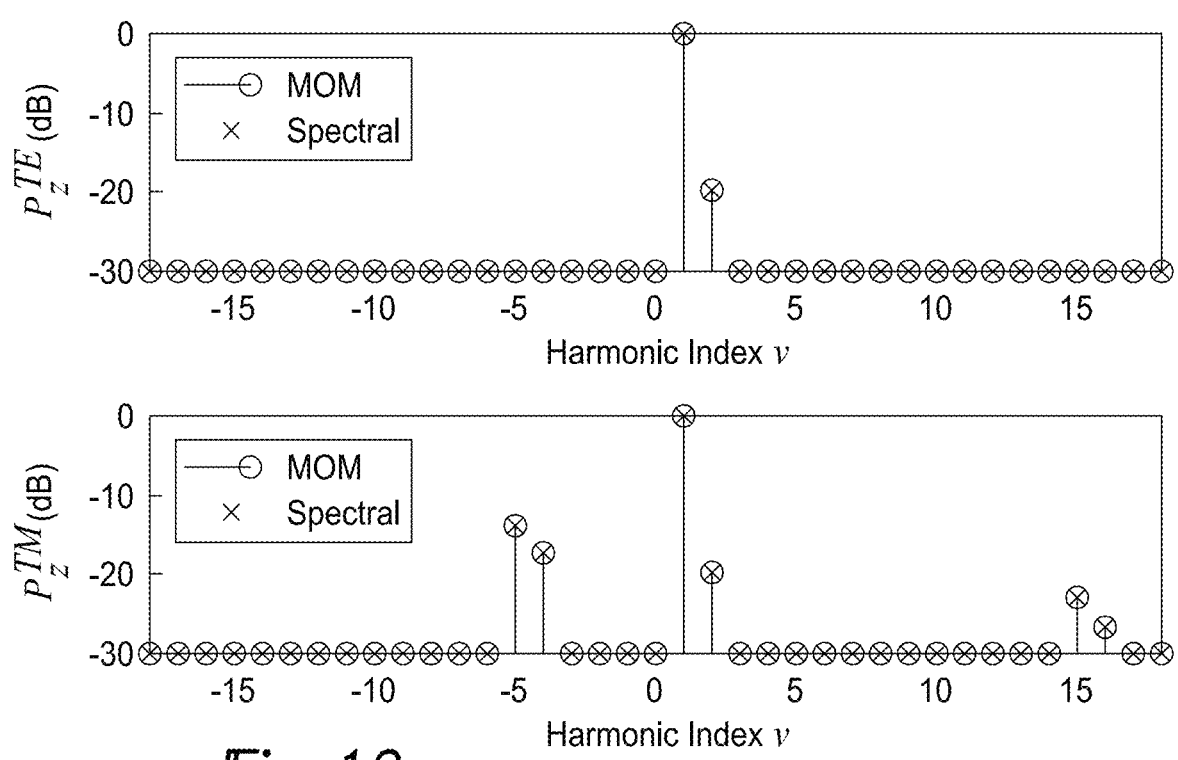
FIG. 10 shows normal power radiated at each frequency $f_0+vf_s$ from the metasurface in FIG. 7 modulated as specified in Case A of Table 1.

The spectrum computed by the spectral-domain method as well as the finest MoM solution is shown in FIG. 10. As expected, the sawtooth wave up-converts the scattered wave to $f_0+f_s$ and deflects it to 42.3°. The expansion in equation (80) used by the spectral-domain method was truncated at p'=±40 and v=±720 for TE illumination and at p'=±100 and v=±49 for TM illumination. The error energy between the spectral-domain method and the MoM solver is $\Delta(\bar{E}^{(MoM)},$ $\overline{E}^{(Spec)})=4.2\times10^{-3}$ for the $TE_z$ simulation and $\Delta(\overline{E}^{(MoM)}, \overline{E}^{(Spec)})=5.0\times10^{-3}$ for the $TM_z$ simulation, confirming the validity of the MoM solver.

Figure 11:
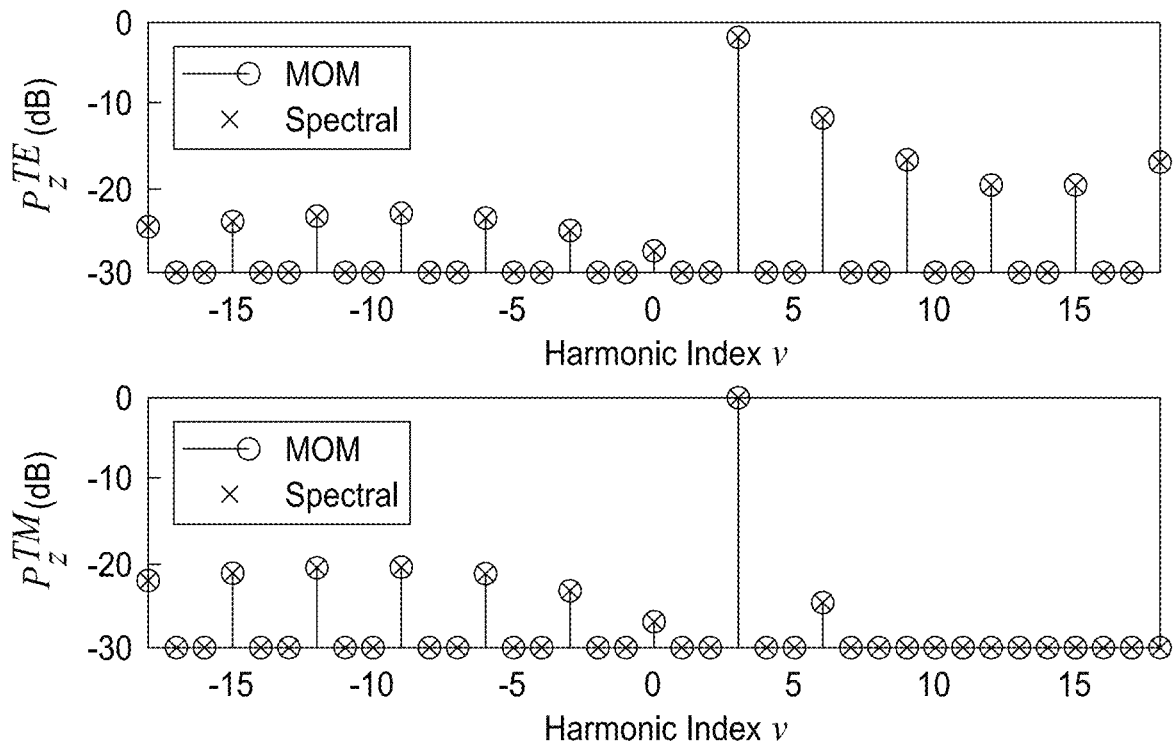
FIG. 11 shows the normal power radiated at each frequency $f_0+vf_s$ from the metasurface in FIG. 7 modulated as specified in case B of Table 1.
Figure 12:
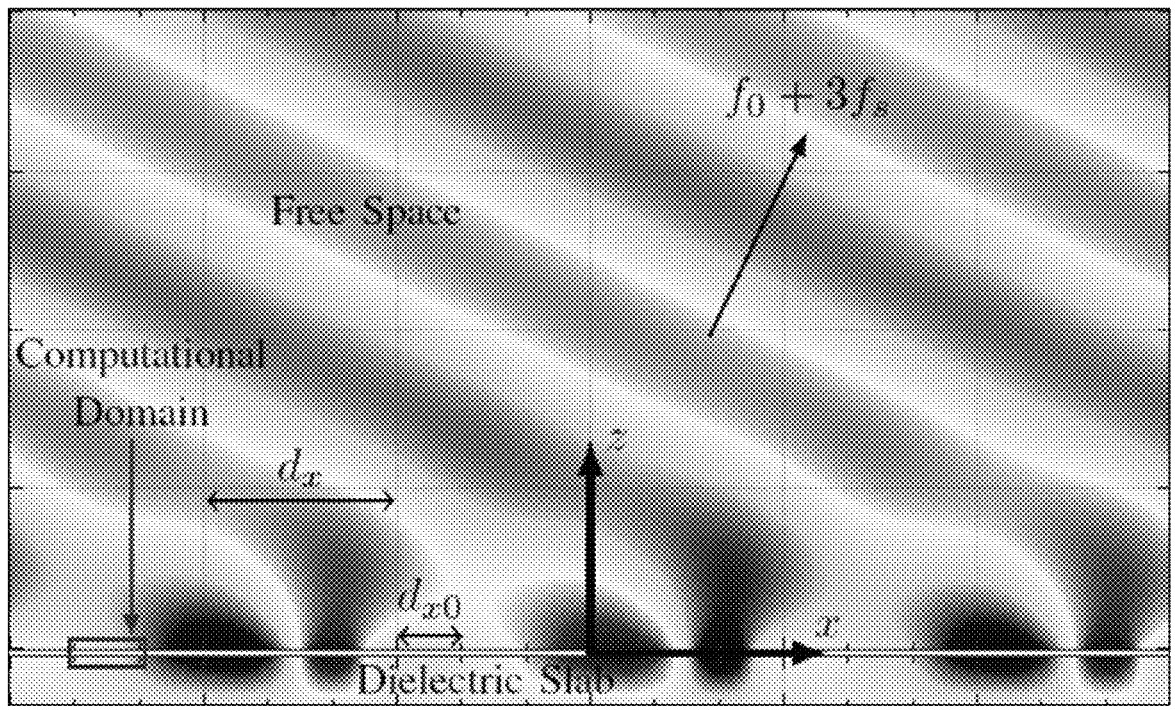
FIG. 12 is a time snapshot of the scattered electric field profile for the metasurface in FIG. 7 modulated as described in case B of Table 1.

For a subwavelength modulation period, results of the MoM and spectral-domain solvers will be compared for the metasurface modulation described in case B of Table I. The only difference between cases A and B is that the number of stixels per supercell is reduced from 20 to 3. Since the stixel size remains the same, this reduces the supercell size from $4\lambda_0$ to $0.6\lambda_0$. As a result, propagation is only supported for frequencies $f_0+p\times3f_s$, for $p\in\mathbb{Z}$. Thus, when a sawtooth phase modulation waveform is applied to the metasurface, one expects the reflected signal to be up-converted from $f_0$ to $f_0+3f_s$. This result is confirmed in FIG. 11. A snapshot of the spatial profile of the scattered electric field for the $TE_z$ case is shown in FIG. 12. Since the modulation frequency is small with respect to the RF carrier frequency ($f_s/f_0=2.5\times10^{-6}$), all the reflected energy is directed in the specular direction. In the MoM simulation, the current expansion included M=301 spatial samples and U=601 frequency harmonics. The expansion in equation (80) used by the spectral-domain method was truncated at p'=±50 and v=±300. The error energy between the MoM and spectral-domain solvers is $\Delta(\overline{E}^{(MoM)}, \overline{E}^{(Spec)})=9.9\times10^{-4}$ for $TE_z$ polarization and $\Delta(\overline{E}^{(MoM)}, \overline{E}^{(Spec)})=8.7\times10^{-3}$ for $TM_z$ polarization.

As a final example, consider a nearly continuous structure described by case C of Table I. In this case, there are 60 stixels included in a spatial period, and the stixel size is brought down to $\lambda_0/10$ (thus the supercell size is $6\lambda_0$). Additionally, assume that the sheet capacitance is sinusoidally modulated at a frequency of 500 MHz. For a spatially uniform sheet capacitance, observe from equation (79) that the $v^{th}$ Fourier series coefficient of the reflection coefficient, $\Gamma_v$, can be computed as $$\Gamma_v = \frac{1}{T_s}\int_{t=0}^{T_s} e^{-2j\tan^{-1}(Z_0^{Tx}\omega_0 C_0^{Tx}\Delta_C(t))} e^{-jv\omega_s t} dt. \quad (82)$$

Thus, if $Z_0^{TX}\omega_0 C_0^{TX}\Delta_C(t)=A\cos\omega_s t$, then the fundamental harmonic of the reflection coefficient is given by $$\Gamma_0 = \frac{1}{T_s}\int_{t=0}^{T_s} e^{-2j\tan^{-1}(A\cos\omega_s t)} dt = \frac{2}{\sqrt{1+A^2}} - 1. \quad (83)$$

When $A=\sqrt{3}$, the fundamental harmonic of the reflection coefficient (and thus the RF carrier frequency of the reflected field) goes to zero. Now suppose one adds a spatial dependence to the modulation function in the form of a continuous traveling-wave, i.e. $C(t)\to C(t-xT_s/d_x)$ where $d_x$ is the spatial modulation period. In this case, when $A=\sqrt{3}$, there should not be any power radiated at the fundamental frequency nor in the specular direction. In other words, the reflected wave is completely redistributed in frequency and spatial spectrum. From FIG. 13, observe that the reflected power at the RF carrier frequency is zero. Since v=0 corresponds to the only frequency which radiates in the specular direction, we can also conclude that no power is reflected back at the specular angle of 25°. In the MoM simulation, the current expansion included M=301 spatial samples and U=101 frequency harmonics. The expansion in equation (80) used by the spectral-domain method was truncated at p'=±75 and v=±50. The error energy between the MoM and spectral-domain solvers is $\Delta(\overline{E}^{(MoM)}, \overline{E}^{(Spec)})=4.4\times10^{-6}$ for $TE_z$ polarization and $\Delta(\overline{E}^{(MoM)}, \overline{E}^{(Spec)})=4.0\times10^{-4}$ for $TM_z$ polarization.

As research into traveling-wave modulated structures progresses, it is vital to develop accurate computational methods capable of efficiently simulating practical designs. Typically, spatially-discrete traveling-wave modulation (SDTWM) is employed in the physical implementation of traveling-wave modulated structures. In each spatial period (i.e. supercell) of a SDTWM structure, staggered modulation signals are applied to a discrete array of sub-cells (i.e. stixels). Unlike in the continuous limit, where closed-form solutions are often available, numerical methods must be used to analyze SDTWM. Due to the complicated space-time dependence of SDTWM structures, fine discretization is required to obtain an adequate model. Further, the computational methods reported to date require the computational domain to extend in space over an entire supercell. As a result, the computational cost can become prohibitive; particularly for simulating complex patterned structures or nearly continuous structures with a large number of stixels per supercell. However, by taking advantage of the space-time symmetry of SDTWM structures, we have shown that the fields within a single stixel determine the entire problem. Therefore, the computational domain can be reduced from an entire supercell to a single stixel. The simplicity of adding this symmetry to computational electromagnetic solvers will enable researchers to study SDTWM for a wide variety of designs.

In this disclosure, a relation between neighboring stixels of a SDTWM structure was derived and incorporated into a method of moments analysis. The derived boundary condition, referred to as the interpath relation, can be interpreted as a modified frequency-harmonic-dependent periodic boundary condition. Using the interpath relation, the fields within a single stixel are sufficient to solve the entire domain. It was shown that the interpath relation can be incorporated into a method of moments solver by slightly modifying the basis functions used to expand the surface current. As a result the number of unknowns required to solve the problem are reduced by a factor of L, the number of stixels in a supercell. The method was applied to a SDTWM sheet capacitance over a grounded dielectric substrate and benchmarked against a spectral-domain solver. Various SDTWM examples were explored to both motivate and validate the proposed method.

Conventionally, the simulation domain of an infinite traveling-wave modulated structure includes an entire spatial period of the structure. The proposed approach requires only the simulation of a fraction of the spatial period: a single stixel (space-time pixel). Traveling-wave modulated structures can be one dimensional (1D), two dimensional (2D) or three dimensional (3D). The spatial period of a 3D traveling-wave modulated structure, that is spatially discretized, can consist of Nx, Ny, and Nz stixels in the three orthogonal directions. Therefore, using the interpath relation reduces the simulation domain by a factor of Nx×Ny×Nz. For a frequency-domain computational technique such as the method-of-moments (MoM), the finite element method (FEM), or finite difference frequency domain method (FDFD), the reduced simulation domain that comes from the interpath relation directly translates to a decreased number of unknowns. The field is expanded in all space into Mf frequency-harmonics. In just one stixel, a cubic mesh can consist of Mx, My, and Mz unknowns along three orthogonal directions. Without the proposed method, simulating these structures requires Mf×(Nx×Mx)×(Ny×My)×(Nz×Mz)

unknowns. Since the proposed method only requires a single stixel to be included in the computational domain, the number of unknowns is reduced by Nx×Ny×Nz. For computational techniques such as the method of moments, the size of the interaction matrix which must be stored in order to solve the problem scales as O (unknowns ^ 2). The proposed method decreases the required storage for these techniques by (Nx×Ny×Nz)^2.

The proposed method can be used to efficiently design the time-delay between neighboring stixels along three orthogonal directions, such that a specified function is achieved. The time-delay Tj between neighboring stixels, along a given dimension j, determines the spatial period along that dimension. The field in a given stixel is periodic in time with period Ts. A single stixel of size Dj along dimension j can contain Uj unknowns along the dimension. Using the proposed technique, Mj unknowns are needed along dimension j regardless of the value of Tj. In contrast, existing simulation techniques would require Mj×Nj unknowns along dimension j, with Nj being the smallest integer such that Nj×Tj/Ts is also an integer. Nj is dependent on the time delay, Tj, between neighboring stixels. Therefore, traditional techniques require a new computational domain consisting of Nj stixels to be constructed for every variation of Tj. Meanwhile, the proposed method uses an identical computational domain for all values of Tj.

Given the computational savings, use of the interpath relation allows for the rapid design/optimization of the modulation waveform or the topology/geometry of the stixels comprising a traveling-wave modulated structure, in order to tailor the spatial and temporal spectrum of the scattered electromagnetic field.

Applications of the designed traveling-wave modulated structures may include frequency conversion or parametric amplification. It can also include the design of non-reciprocal devices, such as one-way mirrors, isolators or circulators for use in full-duplex communication systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

Figure 13:
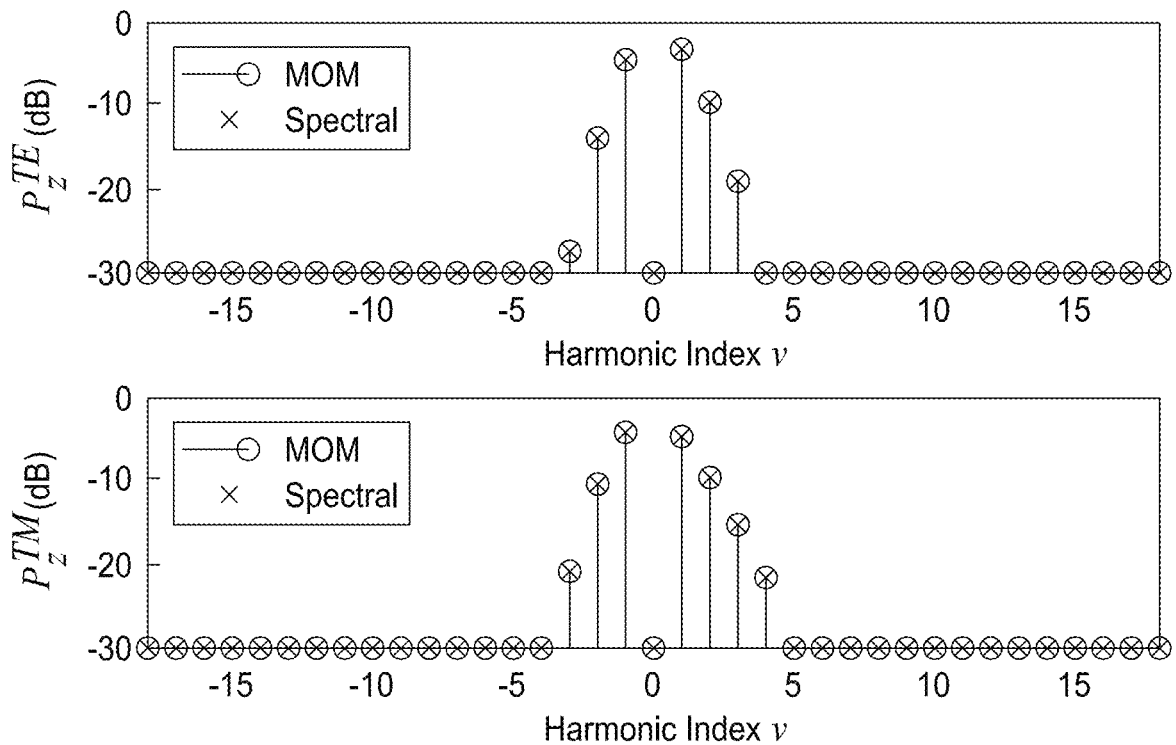
FIG. 13 shows the normal power radiated at each frequency $f_0+vf_s$ from the metasurface in FIG. 7 modulated as specified in case C of Table 1.
Figure 14:
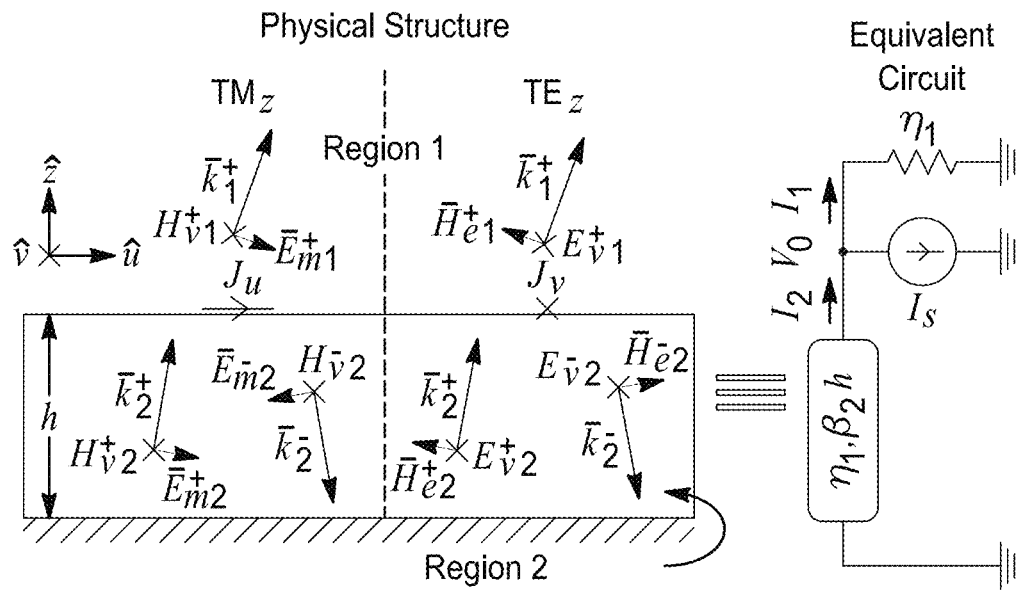
FIG. 14 is a diagram illustrating a grounded dielectric substrate and its equivalent circuit model when exited by planar current sheets.

Derivation of the Spectral-Domain Dyadic Green's Function for a Grounded Dielectric Substrate To obtain the dyadic Green's function used in the MoM formulation, we will impress current sheets of the form $\bar{J}_0 e^{-j(k_x x + k_y y)}$ on the surface of the grounded dielectric substrate as shown in FIG. 13. Define region 1 to be free space and region 2 to be the dielectric substrate. As discussed above, the substrate has a thickness h and a dielectric constant of $\epsilon_r$. Further, define $\bar{k}_\rho = k_x \hat{x} + k_y \hat{y}$. This allows one to define two orthogonal vectors $\hat{u}$ and $\hat{v}$ such that $TM_z$ and $TE_z$ excitations can be handled independently. The unit vector $\hat{v}$ is defined to be orthogonal to $\bar{k}_\rho$, and is given by $$\hat{v} = \frac{\hat{z} \times \bar{k}_\rho}{|\hat{z} \times \bar{k}_\rho|} \qquad (84)$$

The unit vector $\hat{u}$ is defined to be orthogonal to $\hat{v}$ and $\hat{z}$ (i.e. $\hat{u}$ is the unit vector in the direction of $\bar{k}_\rho$), and is given by $$\hat{u} = \hat{v} \times \hat{z} = \frac{\bar{k}_\rho}{|\bar{k}_\rho|} \qquad (85)$$

Decompose $\bar{J}_0$ into two orthogonal components. The component $J_u = \bar{J}_0 \cdot \hat{u}$ excites $TM_z$ waves, while $J_v = \bar{J}_0 \cdot \hat{v}$ excites $TE_z$ waves. Since $E_u$ depends only on $J_u$ and $E_v$ depends only on $J_v$, the Green's function will be a diagonal tensor in the u–v coordinate system. The Green's function is defined such that $$\bar{E}_{0t} = -j k_0 Z_0 \vec{G}(k_x, k_y) \bar{J}_0, \qquad (86)$$

where $\bar{E}_{0t} e^{-j(k_x x + k_y y)}$ is the component of the electric field produced by the impressed current in the x–y plane. The fields excited in both regions can be decomposed into plane waves. In region 1, only upward-traveling waves are excited since the medium is unbounded from above. Meanwhile, in region 2, both upward- and downward-traveling waves are excited by the current sheets. When $J_u$ is nonzero, $TM_z$ waves are excited in regions 1 and 2. As shown in FIG. 13, the magnetic field for this excitation contains a single component along the $\hat{v}$ direction; while the electric field contains components along both the u and z directions. Conversely, when $J_v$ is non-zero, $TE_z$ waves are excited in regions 1 and 2. As shown in FIG. 13, the electric field for this excitation contains a single component along the $\hat{v}$ direction; while the magnetic field contains components along both the $\hat{u}$ and $\hat{z}$ directions.

For both the $TM_z$ and $TE_z$ cases, a transmission line model can be used to find the transverse component of electric field at the interface between regions 1 and 2. As shown in FIG. 13, the transmission line model contains a shorted transmission line representing region 2, a current source representing the impressed current at the interface, and a load representing region 1. Using this model, computing the transverse component of electric field at the interface simply becomes a matter of finding $V_0$ in the equivalent circuit shown in FIG. 13. For $TM_z$ excitations, set $I_s = J_u$ and make the substitutions provided in the first column of Table II. The transverse component of electric field in the $\hat{u}$ direction is found by computing $V_0$. For $TE_z$ excitations, we set $I_s = J_v$ and make the substitutions provided in the second column of Table II. The transverse component of electric field in the $\hat{v}$ direction is found by computing $V_0$.

It is clear that, for either $TM_z$ or $TE_z$ excitations, one must solve for $V_0$ in the equivalent circuit shown in FIG. 13. The impedance looking into the shorted transmission line is given by $Z_2 = j\eta_2 \tan \beta_2 h$. Therefore, the total impedance, $Z_t$, seen by the source is a parallel combination of $\eta_1$ and $Z_2$, given by $$Z_t = \frac{Z_0}{\frac{Z_0}{\eta_1} - j\frac{Z_0}{\eta_2} \cot \beta_2 h}. \qquad (87)$$

Substituting the expressions for 1 and 2 from Table II into (87), obtain $$Z_t^{TM_z} = \frac{Z_0}{\frac{k_0}{\beta_1} - j\frac{\epsilon_r k_0}{\beta_2} \cot \beta_2 h} \qquad (88)$$

-continued $$Z_t^{TE_z} = \frac{Z_0}{\frac{\beta_1}{k_0} - j\frac{\beta_2}{k_0}\cot\beta_2 h} \quad (89)$$

Since $V_0 = -Z_t I_s$ (the minus sign is due to the orientation of $I_s$), the u–v components of $\bar{E}_{0t}$ can be computed as $$\hat{u} \cdot \bar{E}_{0t} = -jk_0 Z_0 G_u J_u \quad (90)$$

$$\hat{v} \cdot \bar{E}_{0t} = -jk_0 Z_0 G_v J_v \quad (91)$$

where $$G_u = \frac{\frac{1}{jk_0}}{\frac{k_0}{\beta_1} - j\frac{\varepsilon_r k_0}{\beta_2}\cot\beta_2 h} \quad (92)$$

$$G_v = \frac{\frac{1}{jk_0}}{\frac{\beta_1}{k_0} - j\frac{\beta_2}{k_0}\cot\beta_2 h} \quad (93)$$

In these expressions, $G_u$ and $G_v$ represent the dyadic Green's function in the u–v coordinate system. To obtain $\overset{\leftrightarrow}{G}$ in the x–y coordinate system, first define $\psi$ such that $\tan\psi = k_y/k_x$. One can subsequently write $\overset{\leftrightarrow}{G}$ as $$\overset{\leftrightarrow}{G}(k_x, k_y) = R(\psi)\begin{bmatrix} G_u & 0 \\ 0 & G_v \end{bmatrix} R(-\psi), \quad (94)$$

where $R(\psi)$ is the rotation matrix given by $$R(\psi) = \begin{bmatrix} \cos\psi & -\sin\psi \\ \sin\psi & \cos\psi \end{bmatrix}. \quad (95)$$

Carrying out the matrix multiplication yields the following expressions for the elements of $\overset{\leftrightarrow}{G}(k_x, k_y)$:

$$\hat{x} \cdot \overset{\leftrightarrow}{G}(k_x, k_y) \cdot \hat{x} = G_u \cos^2\psi + G_v \sin^2\psi \quad (96)$$

$$\hat{y} \cdot \overset{\leftrightarrow}{G}(k_x, k_y) \cdot \hat{y} = G_u \sin^2\psi + G_v \cos^2\psi \quad (97)$$

$$\hat{x} \cdot G(k_x, k_y) \cdot \hat{y} = \hat{y} \cdot G(k_x, k_y) \cdot \hat{x} = \cos\psi\sin\psi(G_u - G_v) \quad (98)$$

Thus the spectral-domain dyadic Green's function has been derived.

What is claimed is:

1. A computational method for simulating a spatially-discrete traveling-wave modulated structure, comprising:
defining a spatially-discrete, traveling-wave modulated structure, where the spatially-discrete, traveling-wave modulated structure is divided into unit cells arranged periodically along one or more spatial dimensions, such that each unit cell exhibits a periodic time-variation of a parameter that is delayed with respect to the periodic time-variation of the parameter exhibited by adjacent cells and the parameter is an electromagnetic property of the unit cells;
applying a zero valued or non-zero valued incident wave of electromagnetic radiation onto the spatially-discrete traveling-wave modulated structure;
defining a boundary condition at edges of a given unit cell of the spatially-discrete traveling-wave modulated structure to compute the electromagnetic field within the given unit cell, where the boundary condition relates the electromagnetic field at opposing edges of the given unit cell by the phase shift of the incident wave and a frequency-harmonic dependent phase shift induced by the spatially-discrete traveling-wave modulation structure; and
computing, by a computer processor, a scattered electric field within the given cell using the boundary condition.

2. The method of claim 1 further comprises computing a scattered electromagnetic field for each unit cell of the spatially-discrete traveling-wave modulated structure using the scattered electric field within a given cell.

3. The method of claim 1 wherein the parameter is further defined as an electronic circuit component or an electromagnetic material property comprising a unit cell.

4. The method of claim 1 wherein the scattered electric field within the given cell is computed using the method of moments executed on the computer processor.

5. The method of claim 1 further comprises defining the boundary condition for the given cell in accordance with $$E(t+lt_{x0}+mt_{y0}+nt_{z0},x+ld_{x0},y+md_{y0},z+nd_{z0}) = e^{j(2\pi v f_0(lt_{x0}+mt_{y0}+nt_{z0})-k_{ix}ld_{x0}-k_{iy}md_{y0}-k_{iz}nd_{z0})}E(t,x,y,z), \forall l,m,n \in \mathbb{Z}$$

in the time domain, where $f_0$ is the frequency of the incident wave; $f_s$ is the fundamental frequency of the periodic time-variation for all unit cells cell; v is an integer denoting the frequency harmonic index; $k_{ix}$, $k_{ix}$, and $k_{iz}$ are the x, y, and z components respectively of the wave-vector of the incident wave; $d_{x0}$, $d_{y0}$ and $d_{z0}$ are the x, y, and z dimensions respectively of a single unit cell; and $t_{0x}$, $t_{0y}$, and $t_{0z}$ are the time-delays between adjacent unit cells along x, y, and z, respectively.

6. The method of claim 1 further comprises defining the boundary condition for the given cell in accordance with $$E(f_0+vf_s,x+ld_{x0},y+md_{y0},z+nd_{z0}) = e^{-j(k_{ix}ld_{x0}+k_{iy}md_{y0}+k_{iz}nd_{z0}+2\pi v f_s(lt_{x0}+mt_{y0}+nt_{z0}))}E(f_0+vf_s,x,y,z), \forall l,m,n \in \mathbb{Z}$$

in the frequency domain, where $f_0$ is the frequency of the incident wave; $f_s$ is the fundamental frequency of the periodic time-variation for all unit cells cell; v is an integer denoting the frequency harmonic index; $k_{ix}$, $k_{ix}$, and $k_{iz}$ are the x, y, and z components respectively of the wave-vector of the incident wave; $d_{x0}$, $d_{y0}$ and $d_{z0}$ are the x, y, and z dimensions respectively of a single unit cell; and $t_{0x}$, $t_{0y}$, and $t_{0z}$ are the time-delays between adjacent unit cells along x, y, and z, respectively.

7. The method of claim 1 wherein the surface of the spatially-discrete traveling-wave modulated structure is further defined as an electromagnetic metasurface.

8. The method of claim 1 wherein the spatially-discrete traveling-wave modulated structure is a loaded transmission-line structure or an acoustically modulated optical waveguide.

9. The method of claim 1 wherein the spatially-discrete traveling-wave modulated structure is comprised of metallic patterns disposed on a dielectric substrate and interconnected by tunable electronic elements.

10. The method of claim 1 further comprises simulating, by the computer processor, time delay between unit cells of the spatially-discrete traveling-wave modulated structure using the computed scattered electric field within the given cell.

11. The method of claim 1 further comprises designing and fabricating the spatially-discrete traveling-wave modulated structure in accordance with the computed scattered electric field within the given cell.

12. The method of claim 1 further comprises designing and fabricating a non-reciprocal device based in part on the computed scattered electric field within the given cell.

13. A computer-implemented method for simulating a spatially-discrete traveling-wave modulated structure, comprising:
  defining a spatially-discrete traveling-wave modulated structure, where the spatially-discrete traveling-wave modulated structure is divided into spatial periods and each spatial period is further divided into multiple cells, such that each cell in a given spatial period exhibits a reactance that varies with time and is delayed with respect to reactance exhibited by other cells in the given spatial period;
  applying a zero valued or non-zero valued incident wave of electromagnetic radiation onto a surface of the spatially-discrete traveling-wave modulated structure;
  defining a boundary condition at edges of a given cell of the spatially-discrete traveling-wave modulated structure, where electromagnetic field at opposing edges of the given cell are related by phase shift of the incident wave and a frequency-harmonic dependent phase shift induced by the spatially-discrete traveling-wave modulated structure; and
  computing a scattered electric field within the given cell using the boundary condition; and
  fabricating the spatially-discrete traveling-wave modulated structure using the computed scattered electric field within the given cell.

14. The method of claim 13 further comprises computing a scattered electric field for each cell of the spatially-discrete traveling-wave modulated structure using the scattered electric field within the given cell.

15. The method of claim 13 wherein the scattered electric field within the given cell is computed using the method of moments executed on a computer processor.

16. The method of claim 13 further comprises defining the boundary condition for the given cell in accordance with $$E\left(t + \frac{T_s l}{L} + \frac{T_s m}{M} + \frac{T_s n}{N}, x + \frac{d_x l}{L}, y + \frac{d_y m}{M}, z + \frac{d_z n}{N}\right)$$
$$= e^{j(2\pi f_0 T_s(l/L+m/M+n/N) - k_{ix} d_x l/L - k_{iy} d_y m/M - k_{iz} d_z n/N)} E(t, x, y, z), \forall\, l, m, n \in \mathbb{Z}$$

in the time domain or $$E\left(f_0 + v f_s, x + \frac{d_x l}{L}, y + \frac{d_y m}{M}, z + \frac{d_z n}{N}\right)$$
$$= e^{-j(k_{ix} d_x l/L + k_{iy} d_y m/M + k_{iz} d_z n/N + 2\pi v(l/L+m/M+n/N))} E(f_0 + v f_s, x, y, z),$$
$$\forall\, l, m, n \in \mathbb{Z}$$

in the frequency domain; where $f_0$ is the frequency of the incident wave; $f_s = 1/T_s$ is the fundamental frequency of the periodic time-variation for all unit cells cell; v is an integer denoting the frequency harmonic index; $k_{ix}$, $k_{iy}$, and $k_{iz}$ are the x, y, and z components respectively of the wave-vector of the incident wave; $d_x$, $d_y$ and $d_z$ are the x, y, and z dimensions respectively of a spatial period; and L, M, and N are number of cells in a spatial period along x, y, and z respectively.

17. The method of claim 13 wherein the surface of the spatially-discrete traveling-wave modulated structure is further defined as an electromagnetic metasurface.

18. The method of claim 13 wherein the spatially-discrete traveling-wave modulated structure is a loaded transmission-line structure.

19. A computational method for simulating a spatially-discrete traveling-wave modulated structure, comprising:
  defining a spatially-discrete, traveling-wave modulated structure, where the spatially-discrete, traveling-wave modulated structure is divided into unit cells arranged periodically along one or more spatial dimensions, such that each unit cell exhibits a periodic time-variation of a parameter that is delayed with respect to the periodic time-variation of the parameter exhibited by adjacent cells and the parameter is an electromagnetic property of the unit cells;
  defining a boundary condition at edges of a given unit cell of the spatially-discrete traveling-wave modulated structure to compute the electromagnetic field within the given unit cell, where the boundary condition relates the electromagnetic field at opposing edges of the given unit cell by an arbitrary stipulated phase shift and a frequency-harmonic dependent phase shift induced by the spatially-discrete traveling-wave modulation structure; and
  computing, by the computer processor, an electric field distribution within the given cell using the boundary condition; and
  designing the time delay between unit cells of the spatially-discrete traveling-wave modulated structure using the computed electric field distribution within the given cell obtained by the computer processor.

* * * * *

UNITED STATES PATENT AND TRADEMARK OFFICE
CERTIFICATE OF CORRECTION

PATENT NO.       : 12,265,285 B1  
APPLICATION NO.  : 17/898622  
DATED            : April 1, 2025  
INVENTOR(S)      : Anthony Grbic et al.

Page 1 of 1

It is certified that error appears in the above-identified patent and that said Letters Patent is hereby corrected as shown below:

In the Claims

At Column 26, Claim number 5, Line 34, delete "$k_{ix}, k_{ix}$" and insert --$k_{ix}, k_{iy}$,--;

At Column 26, Claim number 5, Line 37, delete "$t_{0x}, t_{0y},$ and $t_{0z}$" and insert --$t_{x0}, t_{y0},$ and $t_{z0}$--;

At Column 26, Claim number 6, Line numbers 42-45, delete
"$e^{-j(k_{ix}ld_{x0}+k_{iy}md_{y0}+k_{iz}nd_{z0}+2\pi v f_s(lt_{x0}+mt_{y0}+nt_{z0}))}$" and
insert --$e^{-j\left(k_{ix}ld_{x0}+k_{iy}md_{y0}+k_{iz}nd_{z0}+2\pi v f_s(lt_{x0}+mt_{y0}+nt_{z0})\right)}$--;

At Column 26, Claim number 6, Line 49, delete "$k_{ix}, k_{ix}$," and insert --$k_{ix}, k_{iy}$,--;

At Column 26, Claim number 6, Lines 52-53, delete "$t_{0x}, t_{0y},$ and $t_{0z}$" and insert --$t_{x0}, t_{y0},$ and $t_{z0}$--;

At Column 26, Claim number 16, Line numbers 2-9, delete
"$e^{-j(k_{ix}d_x l/L + k_{iy}d_y m/M + k_{iz}d_z, n/N + 2\pi v(l/L + m/M + n/N))}$" and
insert --$e^{-j\left(k_{ix}d_x l/L + k_{iy}d_y m/M + k_{iz}d_z n/N + 2\pi v(l/L + m/M + n/N)\right)}$--; and At Column 28, Claim number 16, Line 13, delete "$k_{ix}, k_{ix}$," and insert --$k_{ix}, k_{iy}$,--.

Signed and Sealed this  
Twelfth Day of August, 2025

Coke Morgan Stewart  
*Acting Director of the United States Patent and Trademark Office*